12) United States Patent
Yu et al.

(10) Patent No.: US 11,889,583 B2
(45) Date of Patent: Jan. 30, 2024

(54) TRACKING AREA UPDATE METHOD, BROADCAST MESSAGE TRANSMISSION METHOD, AND COMMUNICATIONS APPARATUS

(71) Applicant: Huawei Technologies Co., Ltd., Shenzhen (CN)

(72) Inventors: Tianhang Yu, Hangzhou (CN); Rong Li, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 436 days.

(21) Appl. No.: 17/332,699

(22) Filed: May 27, 2021

(65) Prior Publication Data
US 2021/0289339 A1 Sep. 16, 2021

Related U.S. Application Data

(63) Continuation of application No. PCT/CN2019/109432, filed on Sep. 30, 2019.

(30) Foreign Application Priority Data

Nov. 28, 2018 (CN) .......................... 201811436020.8

(51) Int. Cl.
*H04W 8/08* (2009.01)
*H04W 16/28* (2009.01)
*H04W 84/06* (2009.01)

(52) U.S. Cl.
CPC .............. *H04W 8/08* (2013.01); *H04W 16/28* (2013.01); *H04W 84/06* (2013.01)

(58) Field of Classification Search
CPC ....... H04W 8/08; H04W 16/28; H04W 84/06; H04W 60/04; H04W 24/02; H04W 4/06; H04W 8/14
See application file for complete search history.

(56) References Cited

U.S. PATENT DOCUMENTS 6,567,662 B1 5/2003 Swanchara, III et al.
9,137,768 B1 * 9/2015 Singh .................... H04W 60/00
(Continued)

FOREIGN PATENT DOCUMENTS

CN 102843711 A 12/2012
CN 103348731 A 10/2013
(Continued)

OTHER PUBLICATIONS

Tdoc R2-1817751, Ericsson, Tracking area management and update for NTN, 3GPP TSG-RAN WG2 #104, Spokane, US, Nov. 12-16, 2018, total 4 pages.
(Continued)

*Primary Examiner* — Sudesh M Patidar
(74) *Attorney, Agent, or Firm* — Conley Rose, P.C.

(57) ABSTRACT

A tracking area (TA) update method, a broadcast message transmission method, and a communications apparatus, where the tracking area update method includes: receiving a broadcast message periodically sent by a satellite device, where the broadcast message alternately carries tracking area codes (TACs) corresponding to one or more TAs of at least two TAs, and where coverage of a beam of the satellite device belongs to the at least two TAs; when detecting for the first time that a TA corresponding to a TAC in a broadcast message received in a current period does not belong to a first TA list, recording the TA in a second TA list; continuing detecting a subsequent broadcast message; and determining, based on a TAC in the subsequent broadcast message, whether to initiate a TA update procedure.

22 Claims, 9 Drawing Sheets

(56) References Cited

U.S. PATENT DOCUMENTS

| | | | |
|---|---|---|---|
| 2010/0285816 A1* | 11/2010 | Vos | H04W 60/04 |
| | | | 455/456.1 |
| 2011/0190010 A1* | 8/2011 | Cho | H04W 60/04 |
| | | | 455/458 |
| 2013/0301466 A1 | 11/2013 | Nenner | |
| 2017/0223506 A1 | 8/2017 | Kim et al. | |
| 2018/0070331 A1 | 3/2018 | Byun et al. | |
| 2018/0132096 A1 | 5/2018 | Huo | |
| 2019/0274115 A1 | 9/2019 | Kim et al. | |
| 2020/0077358 A1* | 3/2020 | Kovacs | H04W 8/18 |

FOREIGN PATENT DOCUMENTS

| | | |
|---|---|---|
| CN | 103491521 A | 1/2014 |
| KR | 20170090957 A | 8/2017 |
| KR | 20170125817 A | 11/2017 |
| KR | 20180046812 A | 5/2018 |

OTHER PUBLICATIONS

R3-185706, Huawei, The issue of paging in NTN, 3GPP TSG-RAN3 Meeting #101bis, Chengdu, China, Oct. 8-12, 2018, total 2 pages.

RWS-180025, ETSI MCC, Report of Workshop on 3GPP submission towards IMT-2020, Workshop on 3GPP submission towards IMT-2020, Brussels, Belgium, Oct. 24-25, 2018, total 26 pages.

Fraunhofer 11S, et al., "NR-NTN: Tracking Areas Management," 3GPP TSG-RAN WG2 Meeting #104, Spokane, USA, Nov. 12-16, 2018, R2-1818593, 8 pages.

ZTE, Sanechips, "Tracking Area Management and Paging Handling in NTN," 3GPP TSG-RAN WG3 #102, R3-186328, Spokane, WA, USA, Nov. 12-16, 2018, 14 pages.

* cited by examiner

US 11,889,583 B2

TRACKING AREA UPDATE METHOD, BROADCAST MESSAGE TRANSMISSION METHOD, AND COMMUNICATIONS APPARATUS

CROSS-REFERENCE TO RELATED APPLICATIONS

This application is a continuation of International Patent Application No. PCT/CN2019/109432, filed on Sep. 30, 2019, which claims priority to Chinese Patent Application No. 201811436020.8, filed on Nov. 28, 2018. The disclosures of the aforementioned applications are hereby incorporated by reference in their entireties.

TECHNICAL FIELD

This application relates to the communications field, and in particular, to a tracking area update method, a broadcast message transmission method, and a communications apparatus.

BACKGROUND

With features of wide coverage, long communication distance, high reliability, high flexibility, and high throughput, satellite communications are not affected by a geographical environment, a climate, and a natural disaster, and has been widely used in fields, such as aeronautical communication, maritime communication, and military communication. Introduction of a satellite into a 5th-generation (5G) mobile network can provide communication services for areas, such as a sea and a forest that are difficult to be covered by a terrestrial network, and can enhance reliability of 5G communication, for example, providing more stable and high-quality communication services for a train, an airplane, and users on the means of transportation, providing more data transmission resources, and supporting more connections.

However, signaling overheads for updating a tracking area (TA) in an existing satellite communications system are comparatively high. Therefore, how to reduce the signaling overheads for updating the TA becomes a technical problem to be urgently resolved.

SUMMARY

This application provides a tracking area update method, a broadcast message transmission method, and a communications apparatus, to reduce signaling overheads.

According to a first aspect, a tracking area TA update method is provided. The method includes the following.

A terminal device receives a broadcast message periodically sent by a satellite device. The broadcast message alternately carries tracking area codes (TACs) corresponding to one or more TAs of at least two TAs. Coverage of a beam of the satellite device belongs to the at least two TAs.

When detecting for the first time that a TA corresponding to a TAC in a broadcast message received in a current period does not belong to a first TA list, the terminal device records the TA in a second TA list. The first TA list includes one or more TAs used to page the terminal device. The second TA list is used to store a detected TA that is different from that in the first TA list.

The terminal device continues detecting a subsequent broadcast message, and determines, based on a TAC in the subsequent broadcast message, whether to initiate a TA update procedure.

In other words, when detecting for the first time that the TA corresponding to the TAC in the broadcast message received in the current period does not belong to the first TA list, the terminal device does not immediately initiate the TA update procedure, but determines, based on the TAC in the subsequent broadcast message, whether to initiate the TA update procedure. Therefore, this embodiment of this application avoids unnecessary signaling overheads in a conventional manner in which a TA update procedure is directly initiated once it is detected that a TA does not belong to a TA list.

In this embodiment of this application, a plurality of TACs are allocated to a satellite beam that simultaneously covers a plurality of TAs. The plurality of TACs may be periodically and alternately broadcast, or broadcast at a time. The terminal device may not immediately update a TA when monitoring a TAC change in the satellite beam. Instead, the terminal device updates the TA only after determining that there is no TAC of a TA to which the terminal device belongs in an alternate broadcast period, to avoid signaling overheads caused by unnecessary TA update occurring on some terminal devices due to "TAC hard handover". In addition, if the terminal device is a fixed terminal device or has a limited movement area, there is no need to allocate a larger TA list in this embodiment of this application, thereby reducing paging resources.

It should be understood that, in this embodiment of this application, the first TA list may be maintained by a network side (for example, a core network side or a satellite device side). The terminal device needs to obtain the first TA list from the network side or update the first TA list. For example, the first TA list is obtained by the terminal device using higher layer signaling. The second TA list is maintained and determined by the terminal device.

For example, the first TA list is obtained by the terminal device from a satellite device. As an example, a core network device may determine the first TA list, and send the first TA list to the terminal device using the satellite device. The core network device may page the terminal device using the first TA list. When paging the terminal device, the core network device needs to page the terminal device on beams corresponding to all TAs (that is, beams covering TAs in the first TA list) in the first TA list.

With reference to the first aspect, in an implementation of the first aspect, that the terminal device continues detecting a subsequent broadcast message, and determines, based on a TAC in the subsequent broadcast message, whether to initiate a TA update procedure includes the following.

When detecting that a TA corresponding to the TAC in the subsequent broadcast message does not belong to the first TA list or the second TA list, the terminal device records the TA in the second TA list.

When detecting that at least one TA in a TA corresponding to the TAC in the subsequent broadcast message belongs to the first TA list, the terminal device clears the second TA list.

Alternatively, when the terminal device detects that a TA corresponding to the TAC in the subsequent broadcast message does not belong to the first TA list but belongs to the second list, the terminal device initiates the TA update procedure to update the first TA list, and clears the second TA list.

In other words, when detecting that the TA corresponding to the TAC in the subsequent broadcast message does not belong to the first TA list or the second TA list, the terminal device does not initiate the TA update procedure. When detecting that the at least one TA in the TA corresponding to the TAC in the subsequent broadcast message belongs to the first TA list, the terminal device does not initiate the TA update procedure. Only when the terminal device detects that the TA corresponding to the TAC in the subsequent broadcast message does not belong to the first TA list but belongs to the second list, the terminal device initiates the TA update procedure to update the first TA list.

For example, the TA update procedure may be that the terminal device sends a request to the core network device using the satellite device, to obtain an updated TA list. For a TA update procedure, refer to descriptions in an existing standard. Details are not described herein.

With reference to the first aspect, in an implementation of the first aspect, a broadcast message sent in a period carries one TAC. Alternatively, a broadcast message sent in a period carries a plurality of TACs.

It should be understood that when the broadcast message carries one TAC, the terminal device needs to wait to receive the subsequent broadcast message, and determines, based on the TAC in the subsequent broadcast message, whether to initiate the TA update procedure. In this case, the terminal device can determine, only after the terminal device performs determining in a plurality of periods, whether to initiate the TA update procedure. Waiting time may be comparatively long. When the broadcast message carries the plurality of TACs, determining time of the terminal device may be reduced, that is, waiting time for the terminal device to determine whether to initiate the TA update procedure is shortened.

As an example, a TAC field in a satellite communication broadcast signal may be extended in this embodiment. Assuming that an original TAC field includes y bits of information, an extended TAC field includes Ny bits of information. Every y bits of information may correspond to one same TAC or a plurality of different TACs. The satellite beam may not use a manner of periodically and alternately broadcasting TACs, but uses a manner of broadcasting a plurality of TACs at a time. Alternatively, the satellite device may send the broadcast message in a manner of periodically and alternately broadcasting TACs and broadcasting a plurality of TACs at a time. This manner can reduce waiting time of a user.

With reference to the first aspect, in an implementation of the first aspect, the broadcast message carries first indication information, and the first indication information indicates whether the broadcast message alternately carries TACs in sequence.

With reference to the first aspect, in an implementation of the first aspect, the first indication information is one or more reused bits in a TAC field. Alternatively, the first indication information is one or more newly added bits in a TAC field.

The first indication information is added, such that the terminal device may determine, based on the first indication information, whether the beam is in a phase of periodically and alternately broadcasting the TACs. The first indication information indicates that the broadcast message does not alternately carry the TACs in sequence. After monitoring the change of the TAC, the terminal device may immediately perform the TA update procedure without waiting for a TAC broadcast using a beam in the next period. Therefore, waiting time is reduced and the TA list is updated in a more timely manner.

With reference to the first aspect, in an implementation of the first aspect, the broadcast message carries second indication information, and the second indication information indicates at least one of the following information: a quantity of times for consecutively broadcasting a same TAC, a quantity of periods for consecutively broadcasting a same TAC, a time for consecutively broadcasting a same TAC, or a quantity of TACs that are alternately broadcast.

With reference to the first aspect, in an implementation of the first aspect, the second indication information is one or more reused bits in a TAC field. Alternatively, the second indication information is one or more newly added bits in a TAC field.

In this embodiment of this application, based on the second indication information, the terminal device may no longer continuously monitor the TAC broadcast using the satellite beam, but may choose to continue monitoring the broadcast message at an interval of a specific quantity of periods or a specific period of time. Therefore, in this embodiment of this application, resources and calculation overheads of the terminal device can be reduced.

According to a second aspect, a broadcast message transmission method is provided. The method includes the following.

A satellite device determines that coverage of a beam belongs to at least two TAs.

The satellite device periodically sends a broadcast message using the beam. The broadcast message alternately carries TACs corresponding to one or more TAs of the at least two TAs.

For example, the satellite device may determine, based on ephemeris information, that the coverage of the beam belongs to the at least two TAs, or the satellite device determines, based on indication of a core network device, that the coverage of the beam belongs to the at least two TAs.

It should be understood that the ephemeris information may be information locally stored in the satellite device. The ephemeris information may include information such as beam information (for example, information about the coverage of the beam) and a moving track that are of the satellite device. This is not limited in this embodiment of this application.

In this embodiment of this application, a plurality of TACs are allocated to a satellite beam that simultaneously covers a plurality of TAs. The plurality of TACs may be periodically and alternately broadcast, or broadcast at a time. The terminal device may not immediately update a TA when monitoring a TAC change in the satellite beam. Instead, the terminal device updates the TA only after determining that there is no TAC of a TA to which the terminal device belongs in an alternate broadcast period, to avoid signaling overheads caused by unnecessary TA update occurring on some terminal devices due to "TAC hard handover". In addition, if the terminal device is a fixed terminal device or has a limited movement area, there is no need to allocate a larger TA list in this embodiment of this application, thereby reducing paging resources.

It should be understood that the method performed by the satellite device in the second aspect corresponds to the method performed by the terminal device in the first aspect. For some solutions and achieved effects in the second aspect, refer to the descriptions in the first aspect. To avoid repetition, detailed descriptions are appropriately omitted herein.

With reference to the second aspect, in an implementation of the second aspect, that the satellite device periodically sends a broadcast message includes the following.

The satellite device periodically sends the broadcast message based on a first correspondence between period information of the broadcast message and a TAC.

The first correspondence is prestored in the satellite device. Alternatively, the first correspondence is notified by a core network device.

With reference to the second aspect, in an implementation of the second aspect, the period information includes a sequence number of each period.

The first correspondence includes the sequence number of each period for periodically sending the broadcast message and a TAC that one-to-one corresponds to the sequence number of each period.

With reference to the second aspect, in an implementation of the second aspect, the period information includes a start moment of each period.

The first correspondence includes the start moment of each period for periodically sending the broadcast message and a TAC that one-to-one corresponds to the start moment of each period.

With reference to the second aspect, in an implementation of the second aspect, the period information includes a start moment of a period, and the first relationship includes each TAC and a start moment of a period corresponding to each TAC.

As an example, the satellite device may add a TAC to broadcast messages sent in one or more periods between a start moment of a period corresponding to the TAC and an end moment of the period corresponding to the TAC (namely, a start moment of a period corresponding to a next TAC).

The period information includes a start sequence number of a period, and the first relationship includes each TAC and a start sequence number of a period corresponding to each TAC.

As an example, the satellite device may add a TAC to broadcast messages sent in one or more periods between a start sequence number of a period corresponding to the TAC and an end sequence number of the period corresponding to the TAC (namely, a start sequence number of a period corresponding to a next TAC).

The period information includes an end moment of a period, and the first relationship includes each TAC and an end moment of a period corresponding to each TAC.

As an example, the satellite device may add a TAC to broadcast messages sent in one or more periods between a start moment of a period corresponding to the TAC (namely, an end moment of a period for a TAC previous to the TAC) and an end moment of the period corresponding to the TAC.

The period information includes an end sequence number of a period, and the first relationship includes each TAC and an end sequence number of a period corresponding to each TAC.

As an example, the satellite device may add a TAC to broadcast messages sent in one or more periods between a start sequence number of a period corresponding to the TAC (namely, an end sequence number of a period for a TAC previous to the TAC) and an end sequence number of the period corresponding to the TAC.

The period information includes a period time interval, and the first relationship includes each TAC and a period time interval corresponding to each TAC.

As an example, the satellite device may add a TAC to broadcast messages sent in one or more periods corresponding to a period time interval corresponding to the TAC.

The period information includes a period sequence number interval, and the first relationship includes each TAC and a period sequence number interval corresponding to each TAC.

As an example, the satellite device may add a TAC to broadcast messages sent in one or more periods corresponding to a period sequence number interval corresponding to the TAC.

Alternatively, the period information includes quantity of periods, and the first relationship includes each TAC and quantity of periods corresponding to each TAC.

As an example, the satellite device may add a TAC to broadcast messages sent in one or more periods corresponding to a quantity of periods corresponding to the TAC.

In this embodiment of this application, the satellite device can determine, based on the correspondence between the period information and the TAC, a manner of sending the TAC. Compared with the correspondence between the TAC and the sequence number of the period or period time, the correspondence includes each TAC and period information corresponding to the TAC. Therefore, a data volume is comparatively small. When the correspondence is in the ephemeris information, a data volume of the ephemeris information can be reduced. When the correspondence is indicated by the core network, the signaling overheads and the resources can be reduced.

A same TAC may be consecutively sent in a plurality of periods, and a terminal device may detect each TAC only once. Therefore, calculation overheads can be reduced.

With reference to the second aspect, in an implementation of the second aspect, a broadcast message sent in a period carries one TAC. Alternatively, a broadcast message sent in a period carries a plurality of TACs.

With reference to the second aspect, in an implementation of the second aspect, the broadcast message carries first indication information, and the first indication information indicates whether the broadcast message alternately carries TACs in sequence.

With reference to the second aspect, in an implementation of the second aspect, the first indication information is one or more reused bits in a TAC field. Alternatively, the first indication information is one or more newly added bits in a TAC field.

The first indication information is added, such that the terminal device may determine, based on the first indication information, whether the beam is in a phase of periodically and alternately broadcasting the TACs. The first indication information indicates that the broadcast message does not alternately carry the TACs in sequence. After monitoring a change of a TAC, the terminal device may immediately perform the TA update procedure without waiting for a TAC broadcast using a beam in the next period. Therefore, waiting time is reduced and the TA list is updated in a more timely manner.

With reference to the second aspect, in an implementation of the second aspect, the broadcast message carries second indication information, and the second indication information indicates at least one of the following information: a quantity of times for consecutively broadcasting a same TAC, a quantity of periods for consecutively broadcasting a same TAC, a time for consecutively broadcasting a same TAC, or a quantity of TACs that are alternately broadcast.

With reference to the second aspect, in an implementation of the second aspect, the second indication information is one or more reused bits in a TAC field. Alternatively, the second indication information is one or more newly added bits in a TAC field.

In this embodiment of this application, based on the second indication information, the terminal device may no longer continuously monitor the TAC broadcast using the satellite beam, but may choose to continue monitoring the broadcast message at an interval of a specific quantity of periods or a specific period of time. Therefore, in this embodiment of this application, the resources and calculation overheads of the terminal device can be reduced.

According to a third aspect, a communications apparatus is provided and includes each module or unit configured to perform the method according to the first aspect or any possible implementation of the first aspect.

In an implementation, the communications apparatus is a terminal device.

According to a fourth aspect, a communications apparatus is provided and includes each module or unit configured to perform the method according to the second aspect or any possible implementation of the second aspect.

In an implementation, the communications apparatus is a satellite device.

According to a fifth aspect, a communications apparatus is provided and includes a transceiver, a processor, and a memory. The processor is configured to control the transceiver to receive and send a signal. The memory is configured to store a computer program. The processor is configured to invoke the computer program from the memory for running, such that the communications apparatus performs the method according to the first aspect or the possible implementations of the first aspect.

In an implementation, the communications apparatus is a terminal device.

According to a sixth aspect, a communications apparatus is provided and includes a transceiver, a processor, and a memory. The processor is configured to control the transceiver to receive and send a signal. The memory is configured to store a computer program. The processor is configured to invoke the computer program from the memory for running, such that the communications apparatus performs the method according to the second aspect or the possible implementations of the second aspect.

In an implementation, the communications apparatus is a satellite device.

According to a seventh aspect, a computer-readable medium is provided. The computer-readable medium stores computer programs. When the computer programs are executed by a computer, the method according to the first aspect and the possible implementations of the first aspect is implemented.

According to an eighth aspect, a computer-readable medium is provided. The computer-readable medium stores computer programs. When the computer programs are executed by a computer, the method according to the second aspect and the possible implementations of the second aspect is implemented.

According to a ninth aspect, a computer program product is provided. When the computer program product is executed by a computer, the method according to the first aspect and the possible implementations of the first aspect is implemented.

According to a tenth aspect, a computer program product is provided. When the computer program product is executed by a computer, the method according to the second aspect and the possible implementations of the second aspect is implemented.

According to an eleventh aspect, a processing apparatus is provided and includes a processor and an interface.

According to a twelfth aspect, a processing apparatus is provided and includes a processor, an interface, and a memory.

In the eleventh aspect or the twelfth aspect, the processor is configured to perform the method in any one of the first aspect and the second aspect or the possible implementations of the first aspect and the second aspect. A related data exchange process (for example, sending or receiving data transmission) is completed through the interface. In an implementation process, the interface may further complete the data exchange process using a transceiver.

It should be understood that the processing apparatus in the eleventh aspect or the twelfth aspect may be a chip. The processor may be implemented using hardware or software. When the processor is implemented using hardware, the processor may be a logic circuit, an integrated circuit, or the like. When the processor is implemented using software, the processor may be a general purpose processor, and is implemented by reading software code stored in a memory. The memory may be integrated into the processor, or may be located outside the processor and exist independently.

According to a thirteenth aspect, a system is provided and includes the foregoing satellite device and the foregoing terminal device.

DESCRIPTION OF EMBODIMENTS

The following describes technical solutions of this application with reference to accompanying drawings.

Figure 1:
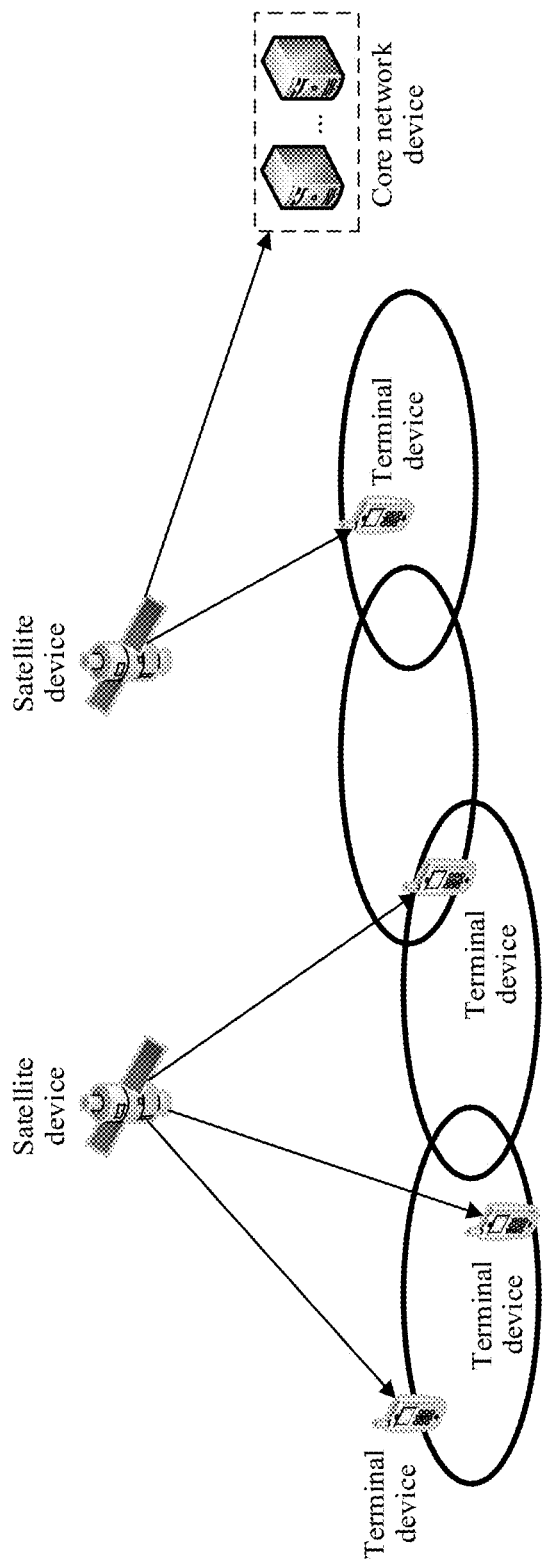
FIG. 1 is a schematic diagram of a mobile satellite communications system scenario to which an embodiment of this application is applicable.

FIG. 1 is a schematic diagram of a mobile satellite communications system scenario to which an embodiment of this application is applicable. The system scenario shown in FIG. 1 includes one or more satellite devices, terminal devices located in beam coverage of the satellite devices, and a core network device.

In the scenario shown in FIG. 1, a satellite device may be connected to the core network device. The satellite device may provide a communications service for a terminal device. The core network device may page the terminal device using the satellite device. For example, the core network device may page, using the satellite device, a terminal device located in beam coverage of the satellite device.

It should be understood that the terminal device in this embodiment of this application may be a device having a wireless communication function. For example, the terminal device may be a handheld device, a vehicle-mounted device, a wearable device, and a computing device that have a wireless communication function, or another processing device connected to a wireless modem. In this embodiment of this application, the terminal device may alternatively be a subscriber unit, a cellular phone, a smartphone, a wireless data card, a personal digital assistant computer, a tablet computer, a wireless modem, a handheld device, a laptop computer, a machine type communications terminal, a computing device having a wireless communication function, another processing device connected to a wireless modem, a vehicle-mounted device, a wearable device, a smart household device, a drone device, a terminal device in a 5G network, a terminal device in a future evolved public land mobile communications network (PLMN), or the like. This is not limited in this embodiment of this application.

It should be understood that, in this embodiment of this application, the core network device may be a mobility management device, for example, a core network element such as an access and mobility management function (AMF) network element, and may be responsible for control plane mobility and access management. For example, the core network device has functions such as estimating satellites that may serve a user to design a TA list, and sending the TA list to the user.

It should be understood that the satellite devices are classified into a high-orbit satellite device, a middle-orbit satellite device, and a low-orbit satellite device based on a height of a running orbit of the satellite devices. A high-orbit satellite is static relative to the ground. One or more high-orbit satellites may provide communications services for a fixed area. A non-high-orbit satellite, for example, a non-geostationary earth orbit (NGEO) satellite device including a middle-orbit satellite and a low-orbit satellite that move at a high-speed relative to the ground and have a respective moving track, usually requires cooperation of a plurality of satellites to provide communication for a fixed area.

The satellite device in this embodiment of this application may be any one of the foregoing satellite devices. For example, the satellite device in this embodiment of this application may be the NGEO satellite device.

It should be understood that, in this embodiment of this application, one satellite device may have one or more beams. For example, one satellite device may have 12 or 16 beams. This is not limited in this embodiment of this application.

In the scenario shown in FIG. 1, the core network device may page, using the satellite device, the terminal device based on a tracking area (TA) list allocated to the terminal device. As an example, the terminal device may locally store the TA list, and the list includes one or more TAs. It should be understood that the first TA list is allocated by a network side (for example, the core network device) to the terminal device. When the terminal device is paged, the core network device needs to page, using the satellite device, the terminal device on all satellite beams covering all TAs in the TA list.

It should be understood that, in this embodiment of this application, a TA is a concept set for location management of the terminal device. Each TA has a tracking area identity (TM). The TM can be calculated based on a tracking area code (TAC) and a public land mobile network (PLMN) identifier. When the terminal device receives a TAC broadcast by a base station, the terminal device calculates a TM and performs matching in the TA list allocated to the terminal device by the core network device. If the terminal device finds that the TAC currently broadcast by the satellite device is not in the TA list allocated to the terminal device, for example, because the terminal device moves, and a TA area in which the terminal device is located may change, as a result, a TA in which the terminal device is located is not in the TA list stored by the terminal device, the terminal device needs to initiate a TA update procedure. The network side (for example, the core network device) reallocates a TA list to the terminal device, to update the local TA list of the terminal device.

Figure 2:
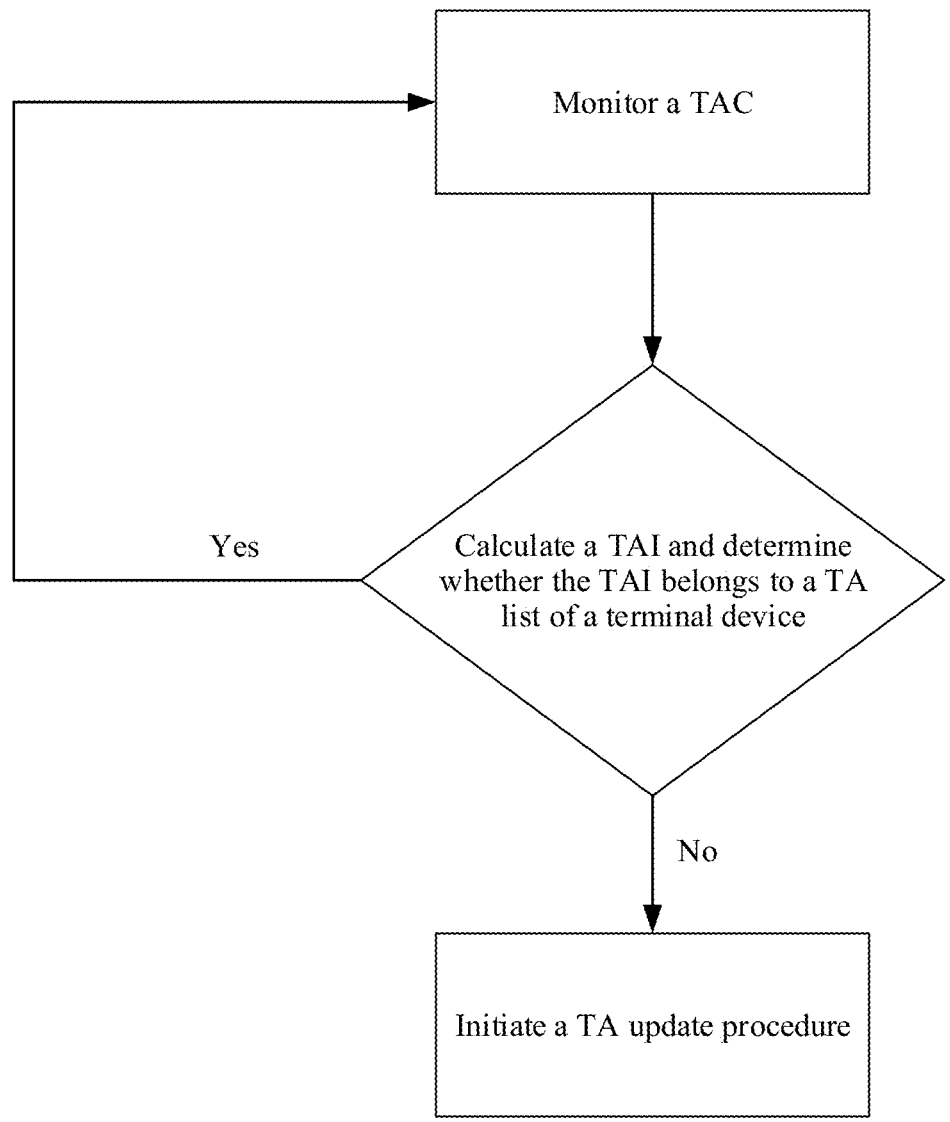
FIG. 2 is a schematic diagram of a TA update method.

FIG. 2 shows a tracking area update method. As an example, as shown in FIG. 2, a terminal device first monitors a TAC broadcast using a satellite beam, then calculates a TM using the monitored TAC, and performs matching in a TA list of the terminal device. If the TM does not belong to the TA list of the terminal device, the terminal device initiates a TA update procedure. Otherwise, the terminal device continues to monitor a TAC.

To ensure better integration between satellite communications and 5G, and reduce signaling overheads caused by frequently updating a tracking area (TA) list, it is proposed in a conventional technology that a TA of a satellite network is bound to a fixed geographical area on the ground, and the TA does not move with a satellite beam. Therefore, a tracking area code (TAC) of satellite coverage needs to change according to a specific rule.

Figure 3:
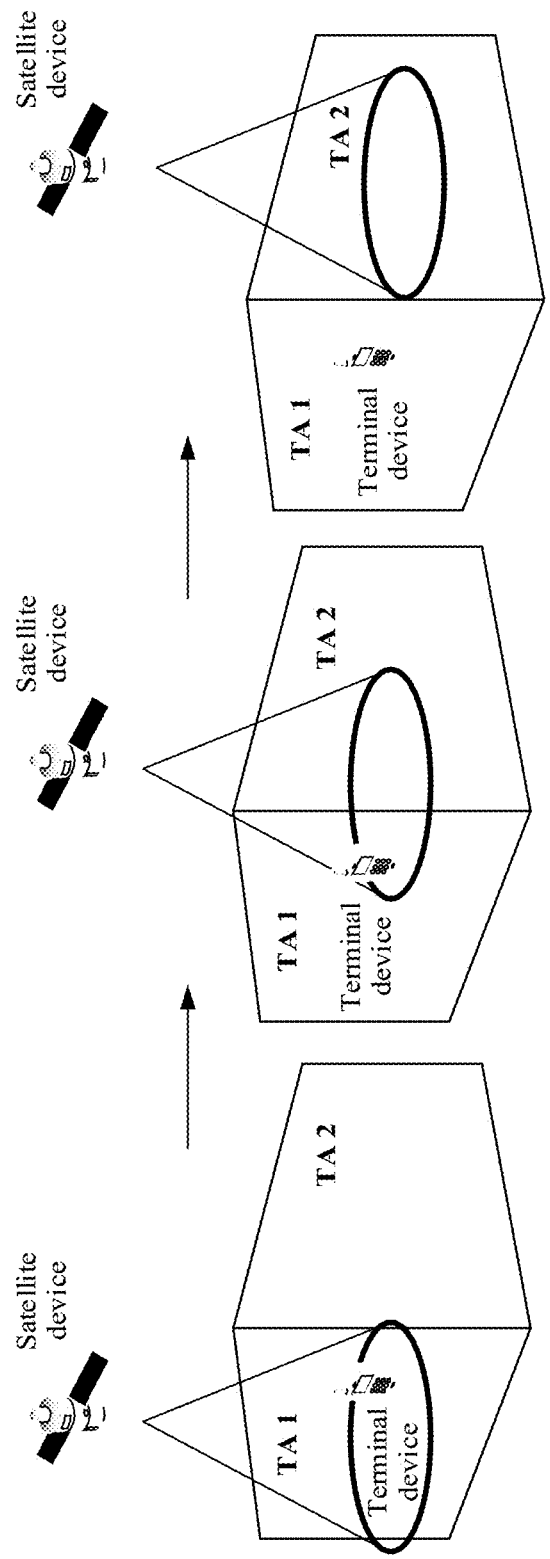
FIG. 3 is a schematic diagram of beam movement according to an embodiment of this application.

However, as shown in FIG. 3, a terminal device is in a TA area. When coverage of a satellite beam moves from a state of being entirely in one TA (for example, a TA 1) to a state of being entirely in another TA (for example, a TA 2), it is not a transition process, but a gradual change process. In a transition phase of TA handover, there is a case in which one satellite beam covers two or more TAs at the same time. For example, in the middle figure in FIG. 3, the beam covers the TA 1 and the TA 2 at the same time. Because an existing satellite broadcast message can carry only one TAC, "hard handover" needs to be performed in existing satellite communications. In other words, in the transition phase of the TA handover, in the broadcast message, a TAC corresponding to the TA 1 is replaced with a TAC corresponding to the TA 2. When the terminal device is located in the TA 1 area, there is not the TA 2 in a TA list of the terminal device. As a result, the terminal device needs to initiate a TA update procedure. However, in this case, the terminal device is still in the TA 1 area, and does not need to update the TA. This manner causes unnecessary signaling overheads.

In another implementation, a TA list that may be allocated by a network side device to a terminal device is (TA 1, TA 2). However, the larger TA list is allocated to the terminal device, and when the terminal device is paged, paging needs to be performed on all satellite beams that broadcast TACs of TAs in the TA list. For the terminal device with a fixed or a comparatively small movement area, this is certainly a waste of paging resources.

In view of the foregoing problems, embodiments of this application provide a TA update method. As an example, in the embodiments of this application, a plurality of TACs may be allocated to a satellite beam that simultaneously covers a plurality of TAs. The plurality of TACs may be periodically and alternately broadcast, or broadcast at a time. A terminal device may not immediately update a TA when monitoring a TAC change in the satellite beam. Instead, the terminal device updates the TA only after determining that there is no TAC of a TA to which the terminal device belongs in an alternate broadcast period, to avoid signaling overheads caused by unnecessary TA update occurring on some terminal devices due to "TAC hard handover". In addition, if the terminal device is a fixed terminal device or has a limited movement area, there is no need to allocate a larger TA list in the embodiments of this application, thereby reducing paging resources.

Figure 4:
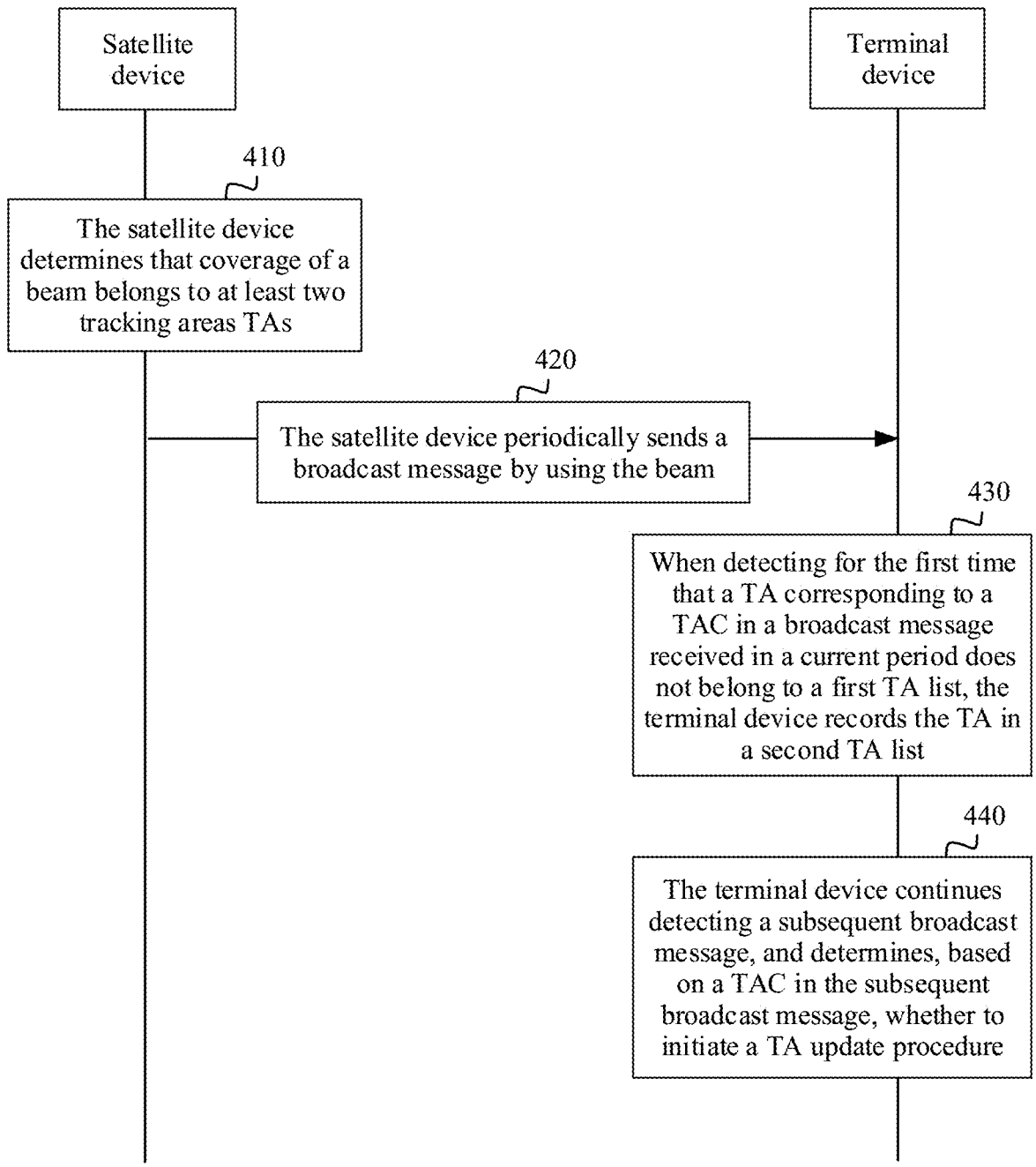
FIG. 4 is a schematic diagram of interaction in a TA update method according to an embodiment of this application.

As an example instead of a limitation, the following describes a TA update method in an embodiment of this application with reference to FIG. 4.

As an example, the method shown in FIG. 4 may be applicable to the satellite communications system shown in FIG. 1. As an example, the method shown in FIG. 4 includes the following steps.

410: A satellite device determines that coverage of a beam belongs to at least two TAs.

For example, the satellite device may determine, based on ephemeris information, that the coverage of the beam belongs to the at least two TAs. Alternatively, the satellite device determines, based on indication of a core network device, that the coverage of the beam belongs to the at least two TAs.

It should be understood that the ephemeris information may be information locally stored in the satellite device. The ephemeris information may include information such as beam information (for example, information about the coverage of the beam) and a moving track that are of the satellite device. This is not limited in this embodiment of this application.

420: The satellite device periodically sends a broadcast message using the beam, where the broadcast message alternately carries TACs corresponding to one or more TAs of the at least two TAs.

Correspondingly, a terminal device receives the broadcast message periodically sent by the satellite device.

In other words, when the satellite device determines that the coverage of the beam belongs to the at least two TAs, the satellite device may send, in sequence, the broadcast message that alternately carries the TACs corresponding to the one or more TAs of the at least two TAs.

For example, if the satellite device determines that the coverage of the beam belongs to a TA 1 and a TA 2, the satellite device may send the broadcast message that alternately carries a TAC 1 corresponding to the TA 1 and a TAC 2 corresponding to the TA 2. For example, the broadcast message that carries the TAC 1 is broadcast in a first period, the broadcast message that carries the TAC 2 is broadcast in a second period, the broadcast message that carries the TAC 1 is broadcast in a third period . . . , and the broadcast message is sent in this manner.

For another example, when the coverage of the beam of the satellite device belongs to a plurality of TAs, for example, three TAs, the satellite device may send a broadcast message that alternately carries TACs corresponding to the three TAs, that is, a TAC 1 corresponding to a TA 1, a TAC 2 corresponding to a TA 2, and a TAC 3 corresponding to a TA 3. For example, a sequence of the TACs carried in the sent broadcast message is the TAC 1, the TAC 2, the TAC 3, the TAC 1, the TAC 2, the TAC 3, and the like.

It should be understood that the foregoing example in which the broadcast message carries the TAC is merely an example, and sequences of the TACs alternately carried in the broadcast message each time may be different. In other words, sequences of the TACs carried in the broadcast message sent in each TAC alternate broadcast period may be the same or different. It should be understood that, in this embodiment of this application, a "TAC alternate broadcast period" may be a period in which all to-be-broadcast TACs are alternately broadcast once when a satellite beam covers a plurality of TAs. For example, when a TAC 1, a TAC 2, and a TAC 3 are alternately broadcast, that is, broadcast TACs are {TAC 1, TAC 2, TAC 3, TAC 1, TAC 2, TAC 3, . . . }, an alternate broadcast period may be a time of broadcasting {TAC 1, TAC 2, TAC 3} once or a time of broadcasting {TAC 2, TAC 3, TAC 1} once. In this case, a duration of one TAC alternate broadcast period is equal to a duration of three periods for sending the broadcast message.

It should be understood that, in this embodiment of this application, a sequence of TACs carried in each TAC alternate broadcast period is not limited to the foregoing TAC 1, TAC 2, and TAC 3. For example, a sequence of TACs carried in one TAC alternate broadcast period may be randomly changed. For example, a sequence of TACs carried in a TAC alternate broadcast period is TAC 3, TAC 1, and TAC 2. For example, a sequence of TACs carried in a plurality of consecutive broadcast messages is TAC 1, TAC 2, TAC 3, TAC 2, TAC 1, TAC 3, TAC 3, TAC 1, TAC 2, and the like.

430: When detecting for the first time that a TA corresponding to a TAC in a broadcast message received in a current period does not belong to a first TA list, the terminal device records the TA in a second TA list, where the first TA list includes one or more TAs used to page the terminal device, and where the second TA list is used to store a detected TA that is different from that in the first TA list.

In other words, when detecting for the first time that the TA corresponding to the TAC in the broadcast message received in the current period does not belong to the first TA list, the terminal device does not immediately initiate a TA update procedure, but records the TA in the second TA list.

It should be understood that, in this embodiment of this application, the first TA list may be maintained by a network side (for example, a core network side or a satellite device side). The terminal device needs to obtain the first TA list from the network side or update the first TA list. For example, the first TA list is obtained by the terminal device using higher layer signaling. The second TA list is maintained and determined by the terminal device.

For example, the first TA list is obtained by the terminal device from a satellite device. As an example, a core network device may determine the first TA list, and send the first TA list to the terminal device using the satellite device. The core network device may page the terminal device using the first TA list. When paging the terminal device, the core network device needs to page the terminal device on beams corresponding to all TAs (that is, beams covering TAs in the first TA list) in the first TA list.

440: The terminal device continues detecting a subsequent broadcast message, and determines, based on a TAC in the subsequent broadcast message, whether to initiate the TA update procedure.

In other words, when detecting for the first time that the TA corresponding to the TAC in the broadcast message received in the current period does not belong to the first TA list, the terminal device does not immediately initiate the TA update procedure, but determines, based on the TAC in the subsequent broadcast message, whether to initiate the TA update procedure. Therefore, this embodiment of this application can avoid paging resource waste in a conventional manner in which a TA update procedure is directly initiated once it is detected that a TA does not belong to a TA list.

As an example, the step of 440 in which the terminal device continues detecting a subsequent broadcast message, and determines, based on a TAC in the subsequent broadcast message, whether to initiate the TA update procedure includes the following.

When detecting that a TA corresponding to the TAC in the subsequent broadcast message does not belong to the first TA list or the second TA list, the terminal device records the TA in the second TA list.

When detecting that at least one TA in a TA corresponding to the TAC in the subsequent broadcast message belongs to the first TA list, the terminal device clears the second TA list.

Alternatively, when the terminal device detects that a TA corresponding to the TAC in the subsequent broadcast message does not belong to the first TA list but belongs to the second list, the terminal device sends the TA update procedure to update the first TA list, and clears the second TA list.

In other words, when detecting that the TA corresponding to the TAC in the subsequent broadcast message does not belong to the first TA list or the second TA list, the terminal device does not initiate the TA update procedure. When detecting that at least one TA in the TA corresponding to the TAC in the subsequent broadcast message belongs to the first TA list, the terminal device does not initiate the TA update procedure. Only when the terminal device detects that the TA corresponding to the TAC in the subsequent broadcast message does not belong to the first TA list but belongs to the second list, the terminal device initiates the TA update procedure to update the first TA list.

For example, the TA update procedure may be that the terminal device sends a request to the core network device using the satellite device, to obtain an updated TA list. For a TA update procedure, refer to descriptions in an existing standard. Details are not described herein.

It should be understood that, in this embodiment of this application, a broadcast message sent in a period may carry one TAC. Optionally, a broadcast message sent in a period may also carry a plurality of TACs.

The foregoing describes an example in which one broadcast message carries one TAC in the step 420. A case in which the broadcast message carries the plurality of TACs is similar to the foregoing case in which the broadcast message carries one TAC. For example, when one broadcast message carries two TACs and coverage of a beam of a satellite device belongs to a plurality of TAs, for example, four TAs, the satellite device may send a broadcast message that alternately carries TACs corresponding to the four TAs, that is, a TAC 1 corresponding to a TA 1, a TAC 2 corresponding to a TA 2, a TAC 3 corresponding to a TA 3, and a TAC 4 corresponding to a TA 4. For example, TACs carried in a broadcast message sent in a first period are the TAC 1 and the TAC 2. A broadcast message sent in a second period carries the TAC 3 and the TAC 4. Then, a broadcast message sent in a third period carries the TAC 1 and the TAC 2 (it should be understood that when a sequence of TACs carried in one TAC alternate broadcast period is not fixed, the TAC 1 and the TAC 2 carried in the periodic broadcast message may be replaced with the TAC 1, the TAC 3, and the like. This is not limited in this embodiment of this application).

It should be understood that when the broadcast message carries one TAC, the terminal device needs to wait to receive the subsequent broadcast message, and determines, based on the TAC in the subsequent broadcast message, whether to initiate the TA update procedure. In this case, the terminal device can determine, only after the terminal device performs determining in a plurality of periods, whether to initiate the TA update procedure. Waiting time may be comparatively long. When the broadcast message carries the plurality of TACs, determining time of the terminal device may be reduced, that is, waiting time for the terminal device to determine whether to initiate the TA update procedure is shortened.

As an example, a TAC field in a satellite communication broadcast signal may be extended in this embodiment. Assuming that an original TAC field includes y bits of information, an extended TAC field includes Ny bits of information. Every y bits of information may correspond to one same TAC or a plurality of different TACs. The satellite beam may not use a manner of periodically and alternately broadcasting TACs, but uses a manner of broadcasting a plurality of TACs at a time. Alternatively, the satellite device may send the broadcast message in a manner of periodically and alternately broadcasting TACs and broadcasting a plurality of TACs at a time. This manner can reduce waiting time of a user.

As an example, in this embodiment of this application, the satellite device may periodically send the broadcast message in a plurality of manners. For example, the satellite device periodically sends the broadcast message based on a first correspondence between period information of the broadcast message and the TAC. The first correspondence may be prestored in the satellite device. Alternatively, the first correspondence is notified by the core network device.

The following describes, using an example in which the broadcast message carries one TAC, forms of sending the broadcast message by the satellite device in different cases, and describes a method for updating a TA by the terminal device in each case. It should be understood that, for a case in which the broadcast message carries the plurality of TACs, refer to the example in which the broadcast message carries one TAC, provided that one TAC carried in the broadcast message is replaced with the plurality of TACs. To avoid repetition, the case in which the broadcast message carries the plurality of TACs is not described in detail.

Case 1

The period information includes a sequence number of each period.

The first correspondence includes the sequence number of each period for periodically sending the broadcast message and a TAC that is in a one-to-one correspondence to the sequence number of each period.

In other words, the satellite device periodically sends the broadcast message based on the sequence number of each period for periodically sending the broadcast message and the TAC that one-to-one corresponds to the sequence number of each period.

As an example, when covering some of a plurality of TAs, the satellite beam periodically and alternately broadcasts the plurality of TACs in this embodiment. As shown in FIG. 3, when a satellite beam is located at a location shown in the left figure, a TAC (a TAC 1) of a TA 1 is continuously broadcast. When the satellite beam is located at a location shown in the middle figure in FIG. 3, the beam covers both the TA 1 and a TA 2. In this case, a plurality of TAs (for example, the TA 1 and the TA 2) are allocated to the beam, and TACs (that is, the TAC 1 and a TAC 2) that are of the TA 1 and the TA 2 are periodically and alternately broadcast. When the beam entirely moves to the TA 2, as shown in the right figure in FIG. 3, a TAC (the TAC 2) of TA 2 is continuously broadcast.

As an example, the foregoing correspondence is shown in Table 1. Table 1 may be learned by a satellite as part of the ephemeris information, or notified by the core network device to the satellite device. The satellite device may determine, based on the correspondence shown in Table 1, the TAC carried in the broadcast message, and send each broadcast message.

It should be understood that in this embodiment of this application, sending time of each period may be specified in the ephemeris information, or may be indicated by the core network device to the satellite device. Period intervals between every two adjacent broadcast messages may be the same. This is not limited in this embodiment of this application.

It should be understood that, in this embodiment of this application, when the satellite beam periodically and alternately broadcasts the TACs that are of the TA 1 and the TA 2, regardless of whether a terminal device in the TA 1 or a terminal device in the TA 2 is paged, the terminal device can be paged on the beam.

TABLE 1

| Sequence number of a broadcast period | TAC |
|---|---|
| 1 | TAC 1 |
| ... | ... |
| m | TAC 1 |
| m + 1 | TAC 2 |
| m + 2 | TAC 1 |
| m + 3 | TAC 2 |
| ... | ... |
| n | TAC 1 |
| n + 1 | TAC 2 |
| n + 2 | TAC 2 |
| ... | ... |

As shown in Table 1, in a first period to an $m^{th}$ period, the coverage of the satellite beam belongs to the TA 1, and broadcast messages in these periods carry one TAC, namely, the TAC 1. From the $m^{th}$ period to an $n^{th}$ period, when the coverage of the satellite beam belongs to the TA 1 and the TA 2, broadcast messages in these periods alternately carry the TAC 1 and the TAC 2. From the $n^{th}$ period, the coverage of the satellite beam belongs to the TA 2, and broadcast messages in these periods carry one TAC, namely, the TAC 2.

The following describes a method for updating the TA by the terminal device in Case 1.

As an example, when detecting that a TA corresponding to the TAC in the subsequent broadcast message does not belong to the first TA list or the second TA list, the terminal device records the TA in the second TA list. When detecting that at least one TA in a TA corresponding to the TAC in the subsequent broadcast message belongs to the first TA list, the terminal device clears the second TA list. Alternatively, when the terminal device detects that a TA corresponding to the TAC in the subsequent broadcast message does not belong to the first TA list but belongs to the second list, the terminal device sends the TA update procedure to update the first TA list.

As an example, in this embodiment of this application, a "TAC waiting and monitoring state" and a "TA monitoring list" (namely, the second TA list) of the terminal device may be set. When the terminal device detects that the TA corresponding to the TAC does not belong to the first TA list, the terminal device enters the TAC waiting and monitoring state, and records the TA in the second TA list. The terminal device does not update the TA. The terminal device waits for and monitors the subsequent broadcast message, and determines, based on the TAC in the subsequent broadcast message, whether to initiate TA update. As an example, in the TAC waiting and monitoring state, the terminal device calculates a TAI using a currently monitored TAC, records the TAC in the TA monitoring list (namely, the second TA list), and waits for a TAC in a next period. It should be understood that the "TA monitoring list" may be a list that records TA information monitored by the terminal device when the terminal device is in the TAC waiting and monitoring state.

Figure 5:
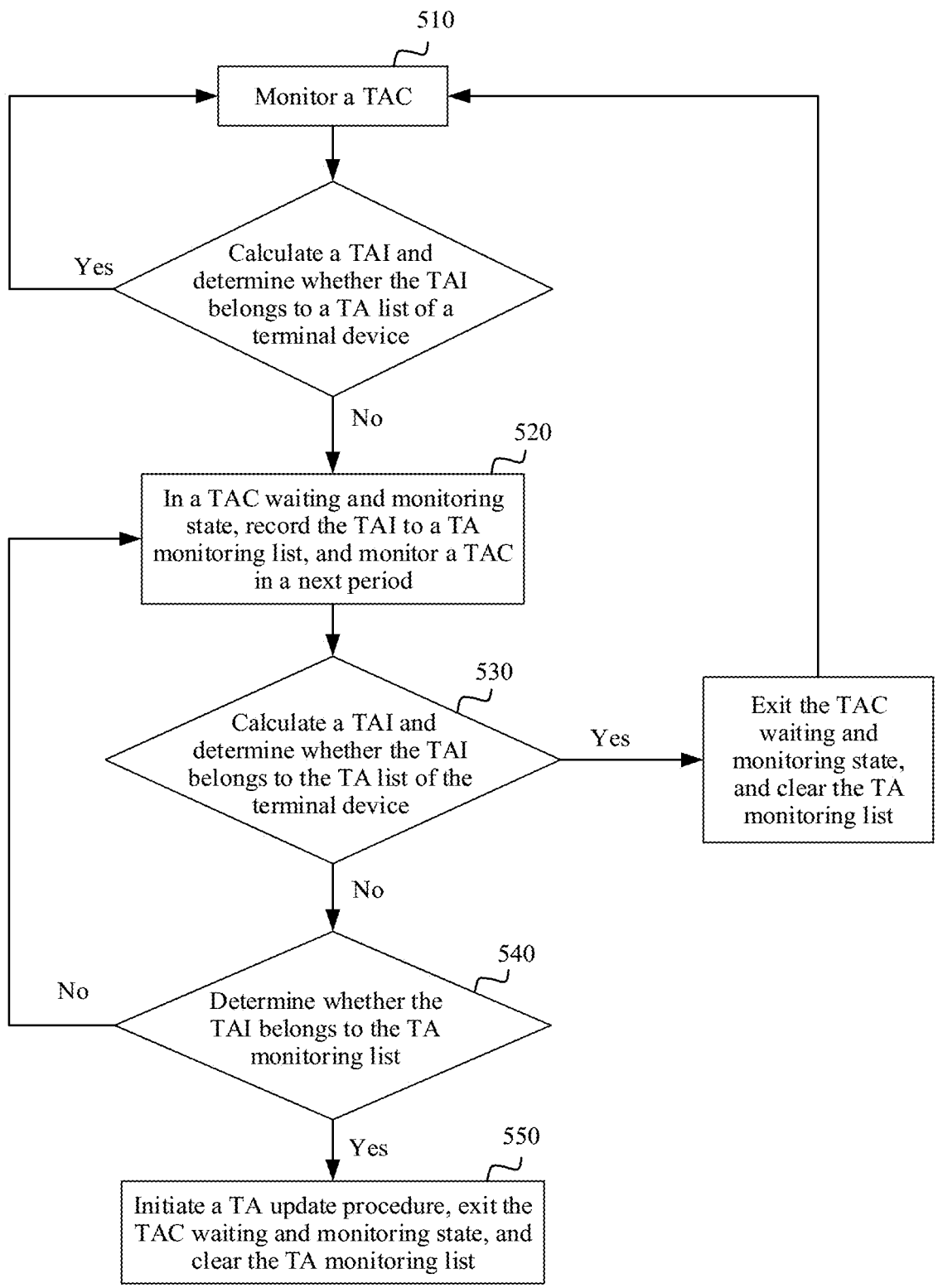
FIG. 5 is a flowchart of a TA update method according to an embodiment of this application.

With reference to FIG. 5, the following describes in detail a method for updating a TA by a terminal device in an embodiment of this application.

510: The terminal device monitors a TAC broadcast using a satellite beam, calculates a TAI, and determines whether the TAI belongs to a TA list (namely, a first TA list) of the terminal device. Additionally, if the TAI belongs to the TA list of the terminal device, the terminal device detects a broadcast message in a next period, and repeatedly performs the step 510; otherwise, the terminal device performs a step 520.

520: Entering a TAC waiting and monitoring state, the terminal device calculates the TAI using the currently monitored TAC, records the TAI in a TA monitoring list (namely, a second TA list), and waits for a TAC broadcast by a satellite in a next period.

530: Calculate a TAI and determine whether the TAI belongs to the TA list of the terminal device; and if the TAI belongs to the TA list of the terminal device, exit the TAC waiting and monitoring state, clear the TA monitoring list, and return to the step 510; or if the TAI does not belong to the TA list of the terminal device, perform a step 540.

540: The terminal device determines whether the TAI belongs to the TA monitoring list; and if the TAI belongs to the TA monitoring list, it indicates that monitoring has been completed in one TAC alternate broadcast period, and no TAC corresponding to a TA in the TA list of the terminal device is monitored within the period, and then the terminal device performs a step 550; otherwise, the terminal device returns to perform the step 520.

550: Initiate a TA update procedure to update the TA list (that is, update the first TA list).

Therefore, in this embodiment of this application, for the terminal device in the coverage of the satellite beam that simultaneously covers a plurality of TAs, there is no need to allocate a larger TA list to the terminal device. This avoids unnecessary TA update caused by "TAC hard handover" of the satellite beam. Therefore, signaling overheads and paging resources are reduced.

Case 2

The period information includes a start moment of each period.

The first correspondence includes the start moment of each period for periodically sending the broadcast message and a TAC that is in a one-to-one correspondence to the start moment of each period.

In other words, the satellite device periodically sends the broadcast message based on the start moment of each period for periodically sending the broadcast message and the TAC that one-to-one corresponds to the start moment of each period.

As an example, the foregoing correspondence is shown in Table 2. Table 2 may be learned by a satellite as part of the ephemeris information, or notified by a network to the satellite device. The satellite device may determine, based on the correspondence shown in Table 2, the TAC carried in the broadcast message, and send each broadcast message.

It should be understood that in this embodiment of this application, sending time of each period may be specified in the ephemeris information, or may be indicated by the core network device to the satellite device. Period intervals between every two adjacent broadcast messages may be the same. This is not limited in this embodiment of this application.

It should be understood that a difference between Table 2 and Table 1 lies in that Table 1 shows the correspondence between the sequence number of each period and the TAC, and Table 2 shows the correspondence between the start moment of each period and the TAC.

Replacing sequence numbers of different periods in Table 1 with start moments of the periods is Table 2. It should be understood that Table 2 shows only an example in which $t_i$ is a start moment of a period, but this is not limited in this embodiment of this application. For example, $t_i$ in Table 2 may be replaced with time information such as an end moment of a period, duration of a period, or an intermediate moment of a period.

As an example, for related descriptions in Table 2, refer to the foregoing descriptions in Table 1. Details are not described herein again.

TABLE 2

| Start moment of each period | TAC |
|---|---|
| $t_1$ | TAC 1 |
| ... | ... |
| $t_m$ | TAC 1 |
| $t_{m+1}$ | TAC 2 |
| ... | ... |

It should be understood that, in Case 2, for a method for updating the TA by the terminal device, refer to the method shown in FIG. 5 in Case 1. To avoid repetition, details are not described herein again.

It should be understood that examples of sending the broadcast message by the satellite device are described above with reference to Case 1 and Case 2. Optionally, in this embodiment of this application, the satellite device may alternatively send the broadcast message in another manner. The following provides detailed descriptions with reference to Case 3.

Case 3

The period information includes a start moment of a period, and the first relationship includes each TAC and a start moment of a period corresponding to each TAC.

The period information includes a start sequence number of a period, and the first relationship includes each TAC and a start sequence number of a period corresponding to each TAC.

The period information includes an end moment of a period, and the first relationship includes each TAC and an end moment of a period corresponding to each TAC.

The period information includes an end sequence number of a period, and the first relationship includes each TAC and an end sequence number of a period corresponding to each TAC.

The period information includes a period time interval, and the first relationship includes each TAC and a period time interval corresponding to each TAC.

The period information includes a period sequence number interval, and the first relationship includes each TAC and a period sequence number interval corresponding to each TAC.

Alternatively, the period information includes quantity of periods, and the first relationship includes each TAC and quantity of periods corresponding to each TAC.

It should be understood that the foregoing noun "each TAC" in Case 3 may be replaced with "each TAC", "every TAC", or "different TACs". In other words, in each manner in Case 3, one TAC corresponds to only one piece of period information, and different TACs correspond to different values of the period information.

In other words, the satellite device periodically sends the broadcast message based on one of a plurality of forms of the first relationship.

Case 3 may be considered as a variation of Case 1 or Case 2, and the satellite device may record, using tables in different forms, TA information broadcast using the satellite beam.

For the plurality of forms in Case 3, the following separately describes how the satellite device sends the broadcast message in each form.

Manner 1: The period information includes the start moment of the period, and the first relationship includes each TAC and the start moment of the period corresponding to each TAC.

It should be understood that, in Manner 1, a start moment of a period for a next TAC may be used as an end moment of a period corresponding to a current TAC.

As an example, the satellite device may add a TAC to broadcast messages sent in one or more periods between a start moment of a period corresponding to the TAC and an end moment of the period corresponding to the TAC (namely, a start moment of a period corresponding to a next TAC).

It should be understood that, in Manner 1, for a method for updating the TA by the terminal device, refer to the method shown in FIG. 5 in Case 1. To avoid repetition, details are not described herein again.

Manner 2: The period information includes the start sequence number of the period, and the first relationship includes each TAC and the start sequence number of the period corresponding to each TAC.

It should be understood that, in Manner 2, a start sequence number of a period for a next TAC may be used as an end sequence number of a period corresponding to a current TAC.

As an example, the satellite device may add a TAC to broadcast messages sent in one or more periods between a start sequence number of a period corresponding to the TAC and an end sequence number of the period corresponding to the TAC (namely, a start sequence number of a period corresponding to a next TAC).

It should be understood that, in Manner 2, for a method for updating the TA by the terminal device, refer to the method shown in FIG. 5 in Case 1. To avoid repetition, details are not described herein again.

Manner 3: The period information includes the end moment of the period, and the first relationship includes each TAC and the end moment of the period corresponding to each TAC.

It should be understood that, in Manner 3, an end moment of a period for a previous TAC may be used as a start moment of a period corresponding to a next TAC.

As an example, the satellite device may add a TAC to broadcast messages sent in one or more periods between a start moment of a period corresponding to the TAC (namely, an end moment of a period for a TAC previous to the TAC) and an end moment of the period corresponding to the TAC.

It should be understood that, in Manner 3, for a method for updating the TA by the terminal device, refer to the method shown in FIG. 5 in Case 1. To avoid repetition, details are not described herein again.

Manner 4: The period information includes the end sequence number of the period, and the first relationship includes each TAC and the end sequence number of the period corresponding to each TAC.

It should be understood that, in Manner 4, an end sequence number of a period for a previous TAC may be used as a start sequence number of a period corresponding to a next TAC.

As an example, the satellite device may add a TAC to broadcast messages sent in one or more periods between a start sequence number of a period corresponding to the TAC (namely, an end sequence number of a period for a TAC previous to the TAC) and an end sequence number of the period corresponding to the TAC.

It should be understood that, in Manner 4, for a method for updating the TA by the terminal device, refer to the method shown in FIG. 5 in Case 1. To avoid repetition, details are not described herein again.

Manner 5: The period information includes the period time interval, and the first relationship includes each TAC and the period time interval corresponding to each TAC.

As an example, the satellite device may add a TAC to broadcast messages sent in one or more periods corresponding to a period time interval corresponding to the TAC.

It should be understood that, in Manner 5, for a method for updating the TA by the terminal device, refer to the method shown in FIG. 5 in Case 1. To avoid repetition, details are not described herein again.

Manner 6: The period information includes the period sequence number interval, and the first relationship includes each TAC and the period sequence number interval corresponding to each TAC.

As an example, the satellite device may add a TAC to broadcast messages sent in one or more periods corresponding to a period sequence number interval corresponding to the TAC.

It should be understood that, in Manner 6, for a method for updating the TA by the terminal device, refer to the method shown in FIG. 5 in Case 1. To avoid repetition, details are not described herein again.

Manner 7: The period information includes the quantity of periods, and the first relationship includes each TAC and the quantity of periods corresponding to each TAC.

As an example, the satellite device may add a TAC to broadcast messages sent in one or more periods corresponding to a quantity of periods corresponding to the TAC.

It should be understood that, in Manner 7, for a method for updating the TA by the terminal device, refer to the method shown in FIG. 5 in Case 1. To avoid repetition, details are not described herein again.

In this embodiment of this application, the satellite device can determine, based on the correspondence between the period information and the TAC, a manner of sending the TAC. Compared with the correspondence between the TAC and the sequence number of the period or period time, the correspondence includes each TAC and period information corresponding to the TAC. Therefore, a data volume is comparatively small. When the correspondence is in the ephemeris information, a data volume of the ephemeris information can be reduced. When the correspondence is indicated by the core network device, the signaling overheads and the resources can be reduced.

The foregoing describes a case in which when the terminal device detects that the TA corresponding to the TAC does not belong to the first TA list, the terminal device enters the TAC waiting and monitoring state. In this case, regardless of whether the terminal needs to initiate the TA update procedure, the terminal needs to wait until a next period, and can determine, based on the broadcast message in the next period, whether to initiate the TA update procedure. Alternatively, in this embodiment of this application, the broadcast message may carry first indication information, and the first indication information indicates whether the broadcast message alternately carries TACs in sequence.

As an example, when the first indication information indicates that the broadcast message alternately carries the TACs in sequence, the manner in FIG. 5 may be used to update the TA. When the first indication information indicates that the broadcast message does not alternately carry the TACs in sequence, and the terminal device detects that the TA corresponding to the TAC does not belong to the first TA list, the terminal device may immediately initiate the TA update procedure without waiting for the next period.

The first indication information is added, such that the terminal device may determine, based on the first indication information, whether the beam is in a phase of periodically and alternately broadcasting the TACs (namely, a phase shown in the middle figure in FIG. 3). The first indication information indicates that the broadcast message does not alternately carry the TACs in sequence. After monitoring the change of the TAC, the terminal device may immediately perform the TA update procedure without waiting for a TAC broadcast using a beam in the next period. Therefore, waiting time is reduced and the TA list is updated in a more timely manner.

Optionally, in an implementation, the first indication information is one or more reused bits in a TAC field.

Figure 6:
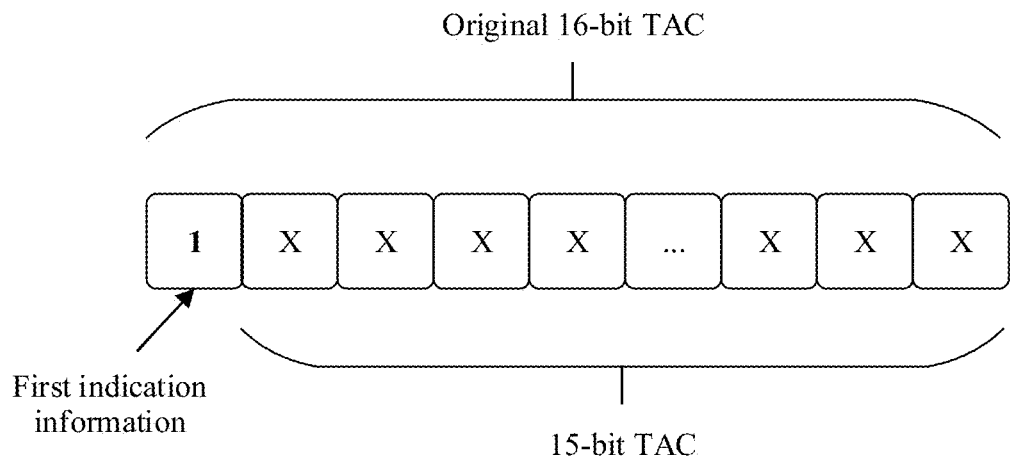
FIG. 6 is a schematic diagram of first indication information according to an embodiment of this application.

For example, 1 bit is used as an example. As shown in FIG. 6, it is assumed that an original TAC field is a 16-bit sequence including 0 and 1, any bit, for example, a first bit is used as the first indication information. When the bit is 1 (or 0), it indicates that the beam is in the phase of periodically and alternately broadcasting the TACs. When the bit is 0 (or 1), it indicates that the beam broadcasts only one TAC.

Optionally, in another implementation, the first indication information is one or more bits newly added to a TAC field.

Figure 7:
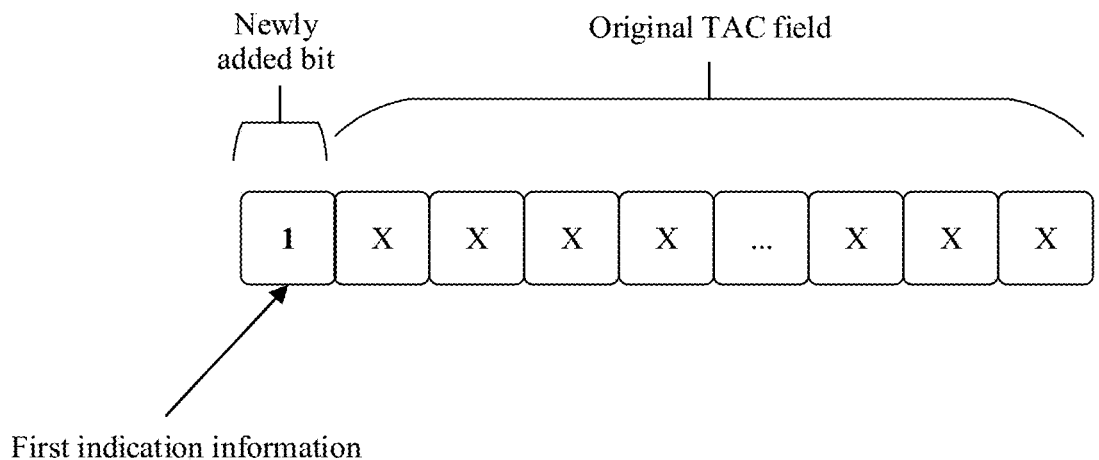
FIG. 7 is a schematic diagram of first indication information according to another embodiment of this application.

For example, 1 bit is used as an example. As shown in FIG. 7, one or more bits are added to an original TAC field as indication information. It is assumed that one-bit indication information is added. When the bit is 1 (or 0), it indicates that the beam is in the phase of periodically and alternately broadcasting the TACs. When the bit is 0 (or 1), it indicates that the beam broadcasts only one TAC.

It should be understood that the first indication information is not limited to one bit. For example, the first indication information may be a plurality of bits, or the first indication information may indicate period duration or a quantity of periods in which a broadcast message carrying a same TAC lasts.

Figure 8:
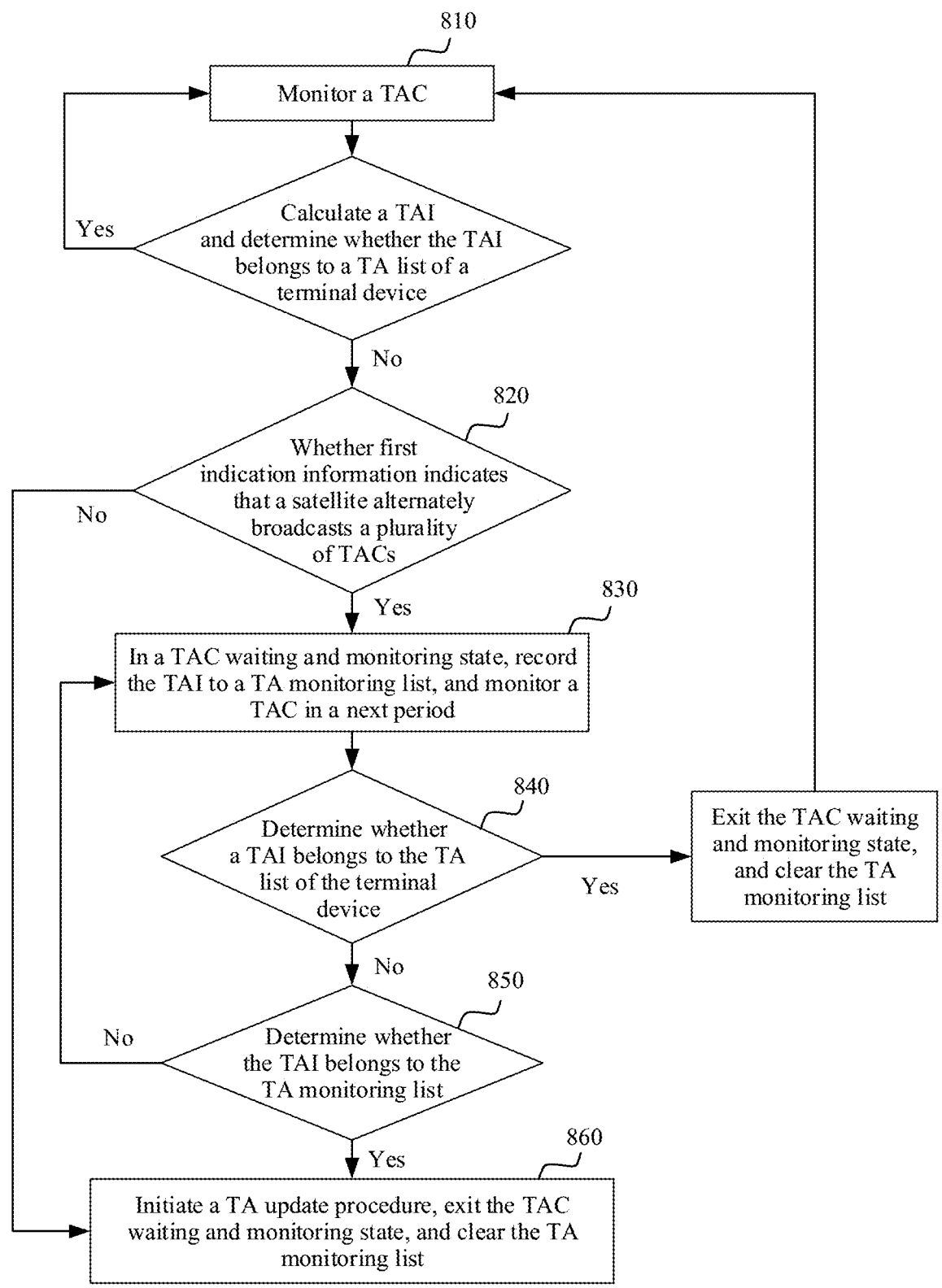
FIG. 8 is a flowchart of a TA update method according to still another embodiment of this application.

With reference to FIG. 8, the following describes in detail a method for monitoring, by a user, a TAC and updating a TA when there is indication information according to an embodiment of this application.

810: The terminal device monitors a TAC broadcast using a satellite beam, calculates a TM, and determines whether the TM belongs to a TA list (namely, a first TA list) of the terminal device; and if the TM belongs to the TA list of the terminal device, the terminal device detects a broadcast message in a next period, and repeatedly performs the step 810; otherwise, the terminal device performs a step 820.

820: The terminal device determines whether first indication information indicates that the satellite beam is in a phase of periodically and alternately broadcasting TACs; and if the first indication information indicates that the satellite beam is in the phase of periodically and alternately broadcasting the TACs, the terminal device enters a step 830; or if the first indication information does not indicate that the satellite beam is in the phase of periodically and alternately broadcasting the TACs, the terminal device enters a step 860.

830: Entering a TAC waiting and monitoring state, the terminal device calculates the TM using the currently monitored TAC, records the TM in a TA monitoring list (namely, a second TA list), and waits for a TAC broadcast by a satellite in a next period.

840: Calculate a TAI and determine whether the TAI belongs to the TA list of the terminal device; and if the TAI belongs to the TA list of the terminal device, exit the TAC waiting and monitoring state, clear the TA monitoring list, and return to the step 810; or if the TAI does not belong to the TA list of the terminal device, perform a step 850.

850: The terminal device determines whether the TAI belongs to the TA monitoring list; and if the TAI belongs to the TA monitoring list, it indicates that monitoring has been completed in one TAC alternate broadcast period, and no TAC corresponding to a TA in the TA list of the terminal device is monitored within the period, and then the terminal device performs a step 860; otherwise, the terminal device returns to perform the step 830.

860: Initiate a TA update procedure to update the TA list (that is, update the first TA list).

In this embodiment, the terminal device may determine, based on the indication information, whether the beam is in the phase of periodically and alternately broadcasting the TACs. In this embodiment of this application, when the first indication information indicates that the broadcast message does not alternately carry the TACs in sequence, for example, when the first indication information is 0, after monitoring the change of the TAC, the terminal device may immediately perform the TA update procedure without waiting for a TAC broadcast using a beam in the next period. Therefore, waiting time is reduced and the TA list is updated in a more timely manner.

Optionally, in another embodiment, in this embodiment of this application, the broadcast message may carry second indication information, and the second indication information indicates at least one of the following information: a quantity of times for consecutively broadcasting a same TAC, a quantity of periods for consecutively broadcasting a same TAC, a time for consecutively broadcasting a same TAC, or a quantity of TACs that are alternately broadcast.

Optionally, the second indication information is one or more reused bits in a TAC field. Alternatively, the second indication information is one or more newly added bits in a TAC field.

Optionally, referring to FIG. 6 or FIG. 7, the first indication information in FIG. 6 or FIG. 7 may be replaced with the second indication information.

Compared with the figure in which any one or more bits newly added in a satellite broadcast signal or reused in the original TAC field are used as the first indication information, in this embodiment of this application, the second indication information does not indicate whether a satellite is in a phase of periodically and alternately broadcasting TACs, but may indicate the quantity of times for consecutive broadcasting the same TAC, the quantity of periods for consecutive broadcasting the same TAC, the time for consecutive broadcasting the same TAC, and the quantity of TACs that are alternately broadcast. Based on the second indication information, the terminal device may no longer continuously monitor the TAC broadcast using the satellite beam, but may choose to continue monitoring the broadcast message at an interval of a specific quantity of periods or a specific period of time. In this manner, the terminal device does not need to continuously monitor the broadcast message. Therefore, resources and calculation overheads of the terminal device can be reduced.

For example, it is assumed that the second indication information indicates (for example, indicates using the quantity of times for consecutive broadcasting the same TAC, the quantity of periods for consecutive broadcasting the same TAC, and the time for consecutive broadcasting the same TAC) to send a TAC 1 in four periods, a TAC 2 in one period, the TAC 1 is in one period, and then the TAC 2 in four periods, the terminal device may determine, based on the second indication information, that the TAC 2 corresponds to four periods. In other words, the terminal device may learn that after sending the TAC 1 in four periods, the TAC 2 in one period, and the TAC 1 in one period, a satellite beam continuously sends the TAC 2. That is, the terminal device learns that after detecting the TAC1 in the last period, the terminal device continuously sends the TAC2 in four periods. Therefore, after detecting the TAC 1 in the last period, the terminal device does not need to wait for a period to determine whether the TAC1 is sent in a next period. Therefore, waiting time is reduced.

For another example, it is assumed that the second indication information indicates that there are two TACs that are alternately broadcast. After sending a TAC 1 in a plurality of consecutive periods, a satellite device sends a TAC 2 in one period, and then sends a TAC 3 in one period. After the terminal device detects the TAC 3, because the second indication information indicates that there are two TACs that are alternately broadcast, the terminal device may learn that a TAC broadcast in a next period is the TAC 2 or the TAC 3 instead of the TAC 1. In this case, assuming that a first list includes only the TAC 1, the terminal device may not monitor a broadcast message in the next period, but can determine that the TAC carried in the broadcast message in the next period is different from the TAC 1. Therefore, waiting time can be reduced.

Therefore, in this embodiment of this application, the second indication information is used to implicitly or explicitly indicate the quantity of periods for broadcasting the same TAC. As such, the terminal device does not need to continuously monitor the broadcast message based on indication of the second indication information. The resources and the calculation overheads of the terminal device can be reduced.

It should be understood that, certainly, in this embodiment of this application, when a broadcast TAC is stable, for example, when the second indication information indicates that a same TAC is broadcast in a plurality of consecutive periods, the terminal device may also monitor or calculate a TAC again after a plurality of periods. Therefore, computing resources are reduced.

It should be understood that, in Case 2, for a method for updating the TA by the terminal device, refer to the method shown in FIG. 5 in Case 1. To avoid repetition, details are not described herein again.

It should be understood that, when there is the second indication information, for a method for updating the TA by the terminal device, refer to the update method in FIG. 5. A difference lies in that in the method in FIG. 5, the terminal device needs to continuously monitor the broadcast message in each period; when there is the second indication information, the terminal device may skip, according to the foregoing description, some broadcast messages that are periodically broadcast, that is, the terminal device does not need to continuously monitor the broadcast message. To avoid repetition, details are not described herein again.

It should be understood that the foregoing examples in FIG. 1 to FIG. 8 are merely intended to help a person skilled in the art understand the embodiments of this application, but are not intended to limit the embodiments of this application to a specific value or a specific scenario in the examples. A person skilled in the art can make various equivalent modifications or changes according to the examples shown in FIG. 1 to FIG. 8, and such modifications or changes also fall within the scope of the embodiments of this application.

It should be understood that sequence numbers of the foregoing processes do not mean execution sequences in various embodiments of this application. The execution sequences of the processes should be determined according to functions and internal logic of the processes, and should not be construed as any limitation on the implementation processes of the embodiments of this application.

The foregoing describes in detail the methods in the embodiments of this application with reference to FIG. 1 to FIG. 8. The following describes apparatuses in the embodiments of this application with reference to FIG. 9 to FIG. 12.

Figure 9:
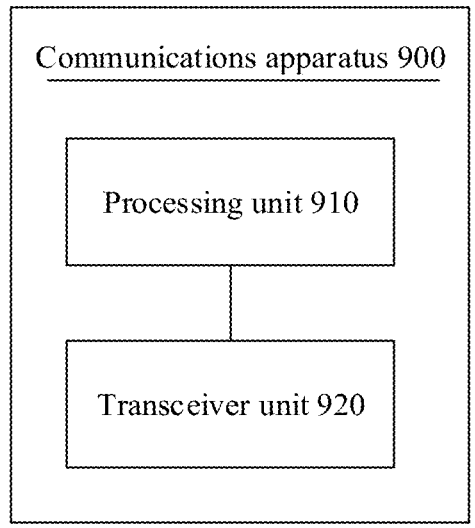
FIG. 9 is a schematic block diagram of a communications apparatus according to this application.

FIG. 9 shows a communications apparatus 900 for data transmission according to an embodiment of this application. The communications apparatus 900 may include a processing unit 910 and a transceiver unit 920.

In an implementation, the communications apparatus 900 can be configured to implement procedures and steps corresponding to the terminal device in the foregoing method embodiments.

As an example, the transceiver unit 920 is configured to receive a broadcast message periodically sent by a satellite device. The broadcast message alternately carries TACs corresponding to one or more TAs of at least two TAs. Coverage of a beam of the satellite device belongs to the at least two TAs.

The processing unit 910 is configured to: when it is detected for the first time that a TA corresponding to a TAC in a broadcast message received in a current period does not belong to a first TA list, record the TA in a second TA list, where the first TA list includes one or more TAs used to page the communications apparatus, and the second TA list is used to store a detected TA that is different from that in the first TA list; and continue detecting a subsequent broadcast message, and determine, based on a TAC in the subsequent broadcast message, whether to initiate a TA update procedure.

In this embodiment of this application, a plurality of TACs are allocated to a satellite beam that simultaneously covers a plurality of TAs. The plurality of TACs may be periodically and alternately broadcast, or broadcast at a time. A terminal device may not immediately update a TA when monitoring a TAC change in the satellite beam. Instead, the terminal device updates the TA only after determining that there is no TAC of a TA to which the terminal device belongs in an alternate broadcast period, to avoid signaling overheads caused by unnecessary TA update occurring on some terminal devices due to "TAC hard handover". In addition, if the terminal device is a fixed terminal device or has a limited movement area, there is no need to allocate a larger TA list in this embodiment of this application, thereby reducing paging resources.

Optionally, the processing unit 910 is configured to: when it is detected that a TA corresponding to the TAC in the subsequent broadcast message does not belong to the first TA list or the second TA list, record the TA in the second TA list; when it is detected that at least one TA in a TA corresponding to the TAC in the subsequent broadcast message belongs to the first TA list, clear the second TA list; or when it is detected that a TA corresponding to the TAC in the subsequent broadcast message does not belong to the first TA list but belongs to the second list, initiate the TA update procedure to update the first TA list, and clear the second TA list.

Optionally, the first TA list is obtained by the communications apparatus using higher layer signaling.

Optionally, a broadcast message sent in a period carries one TAC. Alternatively, a broadcast message sent in a period carries a plurality of TACs.

Optionally, the broadcast message carries first indication information, and the first indication information indicates whether the broadcast message alternately carries TACs in sequence.

Optionally, the first indication information is one or more reused bits in a TAC field, or the first indication information is one or more newly added bits in a TAC field.

Optionally, the broadcast message carries second indication information, and the second indication information indicates at least one of the following information: a quantity of times for consecutively broadcasting a same TAC, a quantity of periods for consecutively broadcasting a same TAC, a time for consecutively broadcasting a same TAC, or a quantity of TACs that are alternately broadcast.

Optionally, the second indication information is one or more reused bits in a TAC field. Alternatively, the second indication information is one or more newly added bits in a TAC field.

It should be understood that the apparatus 900 has any function of the terminal device in the foregoing method embodiments in the figures. Details are not described herein again.

It should be understood that the term "unit" in this embodiment of this application may be an application-specific integrated circuit (ASIC), an electronic circuit, a processor (for example, a shared processor, a dedicated processor, or a group processor) configured to execute one or more software or firmware programs, a memory, a merge logic circuit, and/or another appropriate component that supports the described function.

In an optional example, the apparatus 900 provided in this application corresponds to the process performed by the terminal device in the foregoing method embodiments. For functions of the units/modules in the apparatus, refer to the foregoing descriptions. Details are not described herein again.

It should be understood that, the apparatus in FIG. 9 may be a terminal device, or may be a chip or an integrated circuit installed in a terminal device.

Figure 10:
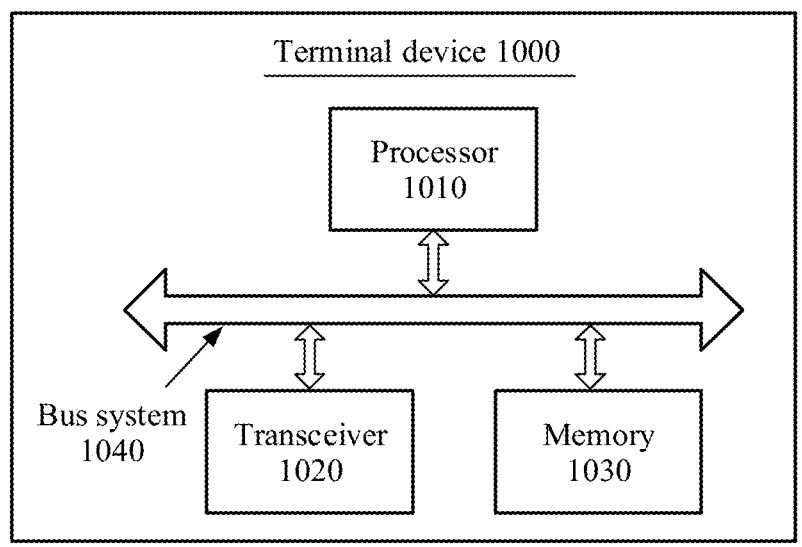
FIG. 10 is a schematic block diagram of a terminal device according to this application.

FIG. 10 is a schematic diagram of a structure of a terminal device 1000 according to an embodiment of this application. The terminal device 1000 may be used in the system shown in FIG. 1.

As shown in FIG. 10, the terminal device 1000 may include a processor 1010 and a transceiver 1020. The processor 1010 is connected to the transceiver 1020. Optionally, the terminal device 1000 further includes a memory 1030. The memory 1030 is connected to the processor 1010. Further, optionally, the terminal device 1000 may further include a bus system 1040. The processor 1010, the memory 1030, and the transceiver 1020 may be connected through the bus system 1040. The memory 1030 may be configured to store an instruction. The processor 1010 may correspond to the processing unit 910, and the transceiver 1020 may correspond to the transceiver unit 920. As an example, the processor 1010 is configured to execute an instruction to control the transceiver 1020 to receive and send information or a signal, and the memory 1030 stores the instruction.

It should be understood that in this embodiment of this application, the processor 1010 may be a central processing unit (CPU), or the processor may be another general purpose processor, a digital signal processor (DSP), an ASIC, a field-programmable gate array (FPGA), or another programmable logic device, discrete gate or transistor logic device, discrete hardware component, or the like. The general purpose processor may be a microprocessor, or the processor may be any conventional processor or the like.

The memory 1030 may include a read-only memory and a random-access memory, and provide an instruction and data to the processor. A part of the memory 1030 may further include a non-volatile random-access memory. For example, the memory 1030 may further store information of a device type.

The bus system 1040 may further include a power bus, a control bus, a status signal bus, and the like, in addition to a data bus. However, for clear description, various types of buses in the figure are marked as the bus system.

In an implementation process, steps in the foregoing methods can be implemented using a hardware integrated logic circuit in the processor, or using instructions in a form of software. Steps of the methods disclosed with reference to the embodiments of this application may be directly executed and accomplished using a hardware processor, or may be executed and accomplished using a combination of hardware and software modules in the processor. A software module may be located in a mature storage medium in the art, such as a random-access memory, a flash memory, a read-only memory, a programmable read-only memory, an electrically erasable programmable memory, or a register. The storage medium is located in the memory, and a processor reads information in the memory and completes the steps in the foregoing methods in combination with hardware of the processor. To avoid repetition, details are not described herein again.

In an implementation, the terminal device 1000 shown in FIG. 10 can implement each process of the terminal device in the foregoing method embodiments. The operations and/or the functions of the modules in the terminal device 1000 are intended to implement corresponding procedures in the foregoing method embodiments. For details, refer to the descriptions in the foregoing method embodiments. To avoid repetition, detailed descriptions are appropriately omitted herein.

Figure 11:
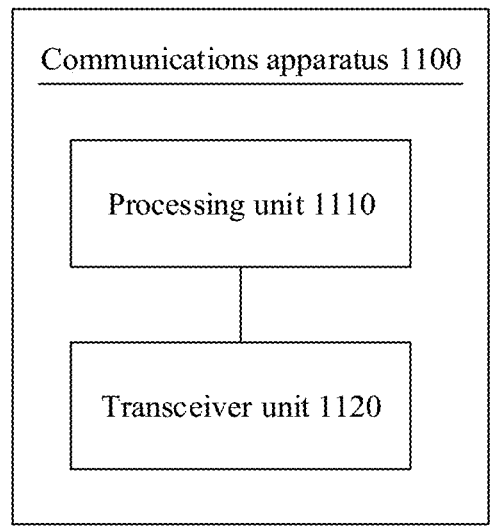
FIG. 11 is a schematic block diagram of another communications apparatus according to this application.

FIG. 11 is a schematic diagram of a structure of a communications apparatus 1100 for data transmission according to an embodiment of this application. The communications apparatus 1100 may include: a processing unit 1110 and a transceiver unit 1120.

The processing unit 1110 is configured to determine that coverage of a beam belongs to at least two TAs.

The transceiver unit 1120 is configured to periodically send a broadcast message using the beam. The broadcast message alternately carries TACs corresponding to one or more of the at least two TAs.

In this embodiment of this application, a plurality of TACs are allocated to a satellite beam that simultaneously covers a plurality of TAs. The plurality of TACs may be periodically and alternately broadcast, or broadcast at a time. A terminal device may not immediately update a TA when monitoring a TAC change in the satellite beam. Instead, the terminal device updates the TA only after determining that there is no TAC of a TA to which the terminal device belongs in an alternate broadcast period, to avoid signaling overheads caused by unnecessary TA update occurring on some terminal devices due to "TAC hard handover". In addition, if the terminal device is a fixed terminal device or has a limited movement area, there is no need to allocate a larger TA list in this embodiment of this application, thereby reducing paging resources.

Optionally, the transceiver unit 1120 is configured to: periodically send the broadcast message based on a first correspondence between period information of the broadcast message and a TAC, where the first correspondence is prestored in the communications apparatus, or the first correspondence is notified by a core network device.

Optionally, the period information includes a sequence number of each period.

The first correspondence includes the sequence number of each period for periodically sending the broadcast message and a TAC that one-to-one corresponds to the sequence number of each period.

Optionally, the period information includes a start moment of each period.

The first correspondence includes the start moment of each period for periodically sending the broadcast message and a TAC that one-to-one corresponds to the start moment of each period.

Optionally, the period information includes a start moment of a period, and the first relationship includes each TAC and a start moment of a period corresponding to each TAC.

The period information includes a start sequence number of a period, and the first relationship includes each TAC and a start sequence number of a period corresponding to each TAC.

The period information includes an end moment of a period, and the first relationship includes each TAC and an end moment of a period corresponding to each TAC.

The period information includes an end sequence number of a period, and the first relationship includes each TAC and an end sequence number of a period corresponding to each TAC.

The period information includes a period time interval, and the first relationship includes each TAC and a period time interval corresponding to each TAC.

The period information includes a period sequence number interval, and the first relationship includes each TAC and a period sequence number interval corresponding to each TAC.

The period information includes quantity of periods, and the first relationship includes each TAC and quantity of periods corresponding to each TAC.

Optionally, a broadcast message sent in a period carries one TAC. Alternatively, a broadcast message sent in a period carries a plurality of TACs.

Optionally, the broadcast message carries first indication information, and the first indication information indicates whether the broadcast message alternately carries TACs in sequence.

Optionally, the first indication information is one or more reused bits in a TAC field, or the first indication information is one or more newly added bits in a TAC field.

Optionally, the broadcast message carries second indication information, and the second indication information indicates at least one of the following information: a quantity of times for consecutively broadcasting a same TAC, a quantity of periods for consecutively broadcasting a same TAC, a time for consecutively broadcasting a same TAC, or a quantity of TACs that are alternately broadcast.

Optionally, the second indication information is one or more reused bits in a TAC field. Alternatively, the second indication information is one or more newly added bits in a TAC field.

It should be understood that the apparatus 1100 has any function of the satellite device in the foregoing method embodiments. Details are not described herein again.

It should be understood that, the apparatus 1100 in FIG. 11 may be a satellite device, or may be a chip or an integrated circuit installed in a satellite device.

Figure 12:
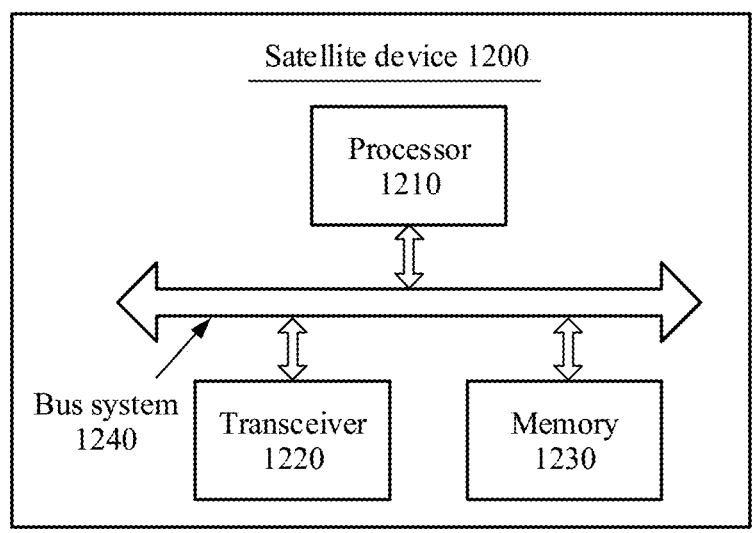
FIG. 12 is a schematic block diagram of a satellite device according to this application.

FIG. 12 is a schematic diagram of a structure of a satellite device 1200 according to an embodiment of this application. The satellite device 1200 may be used in the system shown in FIG. 1.

As shown in FIG. 12, the satellite device 1200 may include a processor 1210 and a transceiver 1220. The processor 1210 is connected to the transceiver 1220. Optionally, the satellite device 1200 further includes a memory 1230. The memory 1230 is connected to the processor 1210. Further, optionally, the satellite device 1200 may further include a bus system 1240. The processor 1210, the memory 1230, and the transceiver 1220 may be connected through the bus system 1240. The memory 1230 may be configured to store an instruction. The processor 1210 may correspond to the processing unit 1110, and the transceiver 1220 may correspond to the transceiver unit 1120. As an example, the processor 1210 is configured to execute an instruction to control the transceiver 1220 to receive and send information or a signal, and the memory 1230 stores the instruction.

In an implementation, the satellite device 1200 shown in FIG. 12 can implement the processes related to the satellite device in the foregoing method embodiments. The operations and/or the functions of the modules in the satellite device 1200 are intended to implement corresponding procedures in the foregoing method embodiments. For details, refer to the descriptions in the foregoing method embodiments. To avoid repetition, detailed descriptions are appropriately omitted herein.

An embodiment of this application further provides a processing apparatus, including a processor and an interface. The processor is configured to perform the communication method in any one of the foregoing method embodiments.

It should be understood that, the processing apparatus may be a chip. For example, the processing apparatus may be an FPGA, an ASIC, a system-on-a-chip (SoC), a CPU, a network processor (NP), a DSP, a micro controller unit (MCU), a programmable controller (PLD), or another integrated chip.

In an implementation process, steps in the foregoing methods can be implemented using a hardware integrated logic circuit in the processor, or using instructions in a form of software. The steps of the method disclosed with reference to the embodiments of this application may be directly performed by a hardware processor, or may be performed using a combination of hardware in the processor and a software module. A software module may be located in a mature storage medium in the art, such as a random-access memory, a flash memory, a read-only memory, a programmable read-only memory, an electrically erasable programmable memory, or a register. The storage medium is located in the memory, and a processor reads information in the memory and completes the steps in the foregoing methods in combination with hardware of the processor. To avoid repetition, details are not described herein again.

It should be noted that, the processor in the embodiments of this application may be an integrated circuit chip, and has a signal processing capability. In an implementation process, steps in the foregoing method embodiments can be implemented using a hardware integrated logic circuit in the processor, or using instructions in a form of software. The foregoing processor may be a general purpose processor, a DSP, an ASIC, an FPGA or another programmable logic device, a discrete gate or transistor logic device, or a discrete hardware component. It may implement or perform the methods, the steps, and logical block diagrams that are disclosed in the embodiments of this application. The general purpose processor may be a microprocessor, or the processor may be any conventional processor or the like. Steps of the methods disclosed with reference to the embodiments of this application may be directly executed and accomplished using a hardware decoding processor, or may be executed and accomplished using a combination of hardware and software modules in the decoding processor. A software module may be located in a mature storage medium in the art, such as a random-access memory, a flash memory, a read-only memory, a programmable read-only memory, an electrically erasable programmable memory, or a register. The storage medium is located in the memory, and a processor reads information in the memory and completes the steps in the foregoing methods in combination with hardware of the processor.

It should be understood that the processor may be implemented using hardware or software. When implemented using hardware, the processor may be a logic circuit, an integrated circuit, or the like. When implemented using software, the processor may be a general purpose processor implemented by reading software code stored in a memory. The memory may be integrated into the processor, or may be located outside the processor and exist independently.

It may be understood that the memory in the embodiments of this application may be a volatile memory or a non-volatile memory, or may include a volatile memory and a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random-access memory (RAM), used as an external cache. Through example but not limitative description, many forms of RAMs may be used, for example, a static random-access memory (SRAM), a dynamic random-access memory (DRAM), a synchronous dynamic random-access memory (SDRAM), a double data rate synchronous dynamic random-access memory (DDR SDRAM), an enhanced synchronous dynamic random-access memory (ESDRAM), a synchronous link dynamic random-access memory (SLDRAM), and a direct rambus random access memory (DR RAM). It should be noted that the memory of the systems and methods described in this specification includes but is not limited to these and any memory of another appropriate type.

An embodiment of this application further provides a communications system. The communications system includes the foregoing satellite device and the foregoing terminal device, and optionally, may further include a core network device.

An embodiment of this application further provides a computer-readable medium. The computer-readable medium stores computer programs. When the computer programs are executed by a computer, the method in any one of the foregoing method embodiments is implemented.

An embodiment of this application further provides a computer program product. When the computer program product is executed by a computer, the method in any one of the foregoing method embodiments is implemented.

All or some of the foregoing embodiments may be implemented using software, hardware, firmware, or any combination thereof. When software is used to implement the embodiments, all or some of the embodiments may be implemented in a form of a computer program product. The computer program product includes one or more computer instructions. When the computer instructions are loaded and executed on the computer, the procedure or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a web site, computer, server, or data center to another website, computer, server, or data center in a wired (for example, a coaxial cable, an optical fiber, or a digital subscriber line (digital subscriber line, DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a high-density digital video disc (DVD), a semiconductor medium (for example, a solid-state drive (SSD)), or the like.

It should be understood that the foregoing describes a communication method used in downlink transmission in a communications system. However, this is not limited in this application. Optionally, a solution similar to the foregoing solution may also be used in uplink transmission. To avoid repetition, details are not described herein again.

The network device and the terminal device in the foregoing apparatus embodiments entirely correspond to the network device and the terminal device in the method embodiments. A corresponding module or unit performs a corresponding step. For example, the sending module (transmitter) performs a sending step in the method embodiments, the receiving module (receiver) performs a receiving step in the method embodiments, and another step other than the sending step and the receiving step may be performed by the processing module (processor). For a function of a specific module, refer to the corresponding method embodiments. The sending module and the receiving module may form a transceiver module, and the transmitter and the receiver may form a transceiver, to jointly implement receiving and sending functions. There may be one or more processors.

In this application, "at least one" means one or more, and "a plurality of" means two or more. The term "and/or" describes an association relationship for describing associated objects and represents that three relationships may exist. For example, A and/or B may represent the following cases: Only A exists, both A and B exist, and only B exists, where A and B may be singular or plural. The character "/" generally indicates an "or" relationship between the associated objects. "At least one of the following" or a similar expression thereof indicates any combination of the following, and includes any combination of one or more of the following. For example, at least one item (piece) of a, b, or c may indicate a, b, c, a and b, a and c, b and c, or a, b, and c, where a, b, and c may be singular or plural.

It should be understood that "an embodiment" or "an embodiment" mentioned in the entire specification does not mean that particular features, structures, or characteristics related to the embodiment are included in at least one embodiment of this application. Therefore, "in an embodiment" or "in an embodiment" appearing in the specification does not refer to a same embodiment. In addition, these particular features, structures, or characteristics may be combined in one or more embodiments using any appropriate manner. It should be understood that sequence numbers of the foregoing processes do not mean execution sequences in various embodiments of this application. The execution sequences of the processes should be determined according to functions and internal logic of the processes, and should not be construed as any limitation on the implementation processes of the embodiments of this application.

Terminologies such as "component", "module", and "system" used in this specification are used to indicate computer-related entities, hardware, firmware, combinations of hardware and software, software, or software being executed. For example, a component may be, but is not limited to, a process that runs on a processor, a processor, an object, an executable file, a thread of execution, a program, and/or a computer. As shown in figures, both a computing device and an application that runs on a computing device may be components. One or more components may reside within a process and/or a thread of execution, and a component may be located on one computer and/or distributed between two or more computers. In addition, these components may be executed from various computer-readable media that store various data structures. For example, the components may communicate using a local and/or remote process and according to, for example, a signal having one or more data packets (for example, data from two components interacting with another component in a local system, a distributed system, and/or across a network such as the internet interacting with other systems using the signal).

It should be further understood that the first, second, third, fourth, and various numbers included in this specification are merely distinguished for convenient description, and are not intended to limit the scope of the embodiments of this application.

It should be understood that the term "and/or" in this specification describes only an association relationship for describing associated objects and represents that three relationships may exist. For example, A and/or B may represent the following three cases: Only A exists, both A and B exist, and only B exists.

A person of ordinary skill in the art may be aware that, in combination with illustrative logical blocks described in the embodiments disclosed in this specification and steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

All or some of the foregoing embodiments may be implemented using software, hardware, firmware, or any combination thereof. When software is used to implement the embodiments, all or some of the embodiments may be implemented in a form of a computer program product. The computer program product includes one or more computer instructions (programs). When the computer program instructions (programs) are loaded and executed on the computer, the procedure or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a web site, computer, server, or data center to another website, computer, server, or data center in a wired (for example, a coaxial cable, an optical fiber, or a DSL) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, an (SSD), or the like.

The foregoing descriptions are merely example implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A tracking area (TA) update method, comprising:
   receiving, by a terminal device, a broadcast message periodically sent by a satellite device, wherein the broadcast message alternately carries tracking area codes (TACs) corresponding to one or more TAs of at least two TAs, and wherein coverage of a beam of the satellite device belongs to the at least two TAs;
   recording, by the terminal device when detecting for a first time that a TA corresponding to a TAC in a current broadcast message received in a current period does not belong to a first TA list, the TA in a second TA list, wherein the first TA list comprises one or more first TAs configured to page the terminal device, and wherein the second TA list is configured to store a detected TA that is not in the first TA list;
   continuing to detect, by the terminal device, a subsequent broadcast message; and
   determining, based on a subsequent TAC in the subsequent broadcast message, whether to initiate a TA update procedure to update the first TA list.

2. The TA update method according to claim 1, wherein continuing to detect the subsequent broadcast message and determining whether to initiate the TA update procedure comprises:
   recording, by the terminal device when detecting that a subsequent TA corresponding to the subsequent TAC does not belong to the first TA list or the second TA list, the subsequent TA in the second TA list; and
   clearing, by the terminal device, the second TA list when detecting that at least one TA in the subsequent TA belongs to the first TA list; or
   initiating, by the terminal device, the TA update procedure and clearing the second TA list when the terminal device detects that a subsequent TA corresponding to the subsequent TAC belongs to the second TA list but not the first list.

3. The TA update method according to claim 1, wherein a first broadcast message sent in a period carries one TAC or a plurality of TACs.

4. The TA update method according to claim 1, wherein the broadcast message carries first indication information, and wherein the first indication information indicates whether the broadcast message alternately carries TACs in sequence.

5. The TA update method according to claim 4, wherein the first indication information comprises one or more reused bits in a TAC field or one or more newly added bits in a TAC field.

6. A broadcast message transmission method, comprising:
   determining, by a satellite device, that coverage of a beam belongs to at least two tracking areas (TAs); and
   periodically sending, by the satellite device, a broadcast message using the beam,
   wherein the broadcast message alternately carries tracking area codes (TACs) corresponding to one or more TAs of the at least two TAs.

7. The broadcast message transmission method according to claim 6, wherein periodically sending the broadcast message comprises periodically sending, by the satellite device, the broadcast message based on a first correspondence between period information of the broadcast message and a TAC, and wherein the first correspondence is one of prestored in the satellite device or notified by a core network device.

8. The broadcast message transmission method according to claim 7, wherein the period information comprises a sequence number of each period, and wherein the first correspondence comprises:
the sequence number of each period for periodically sending the broadcast message and a first TAC that is in one-to-one correspondence with the sequence number of each period; or
a start moment of each period for periodically sending the broadcast message and a second TAC that is in one-to-one correspondence with the start moment of each period.

9. The broadcast message transmission method according to claim 7, wherein:
the period information comprises a start moment of a period, and the first correspondence comprises each TAC and each start moment corresponding to each TAC;
the period information comprises a start sequence number of a period, and the first correspondence comprises each TAC and each start sequence number corresponding to each TAC;
the period information comprises an end moment of a period, and the first correspondence comprises each TAC and each end moment corresponding to each TAC;
the period information comprises an end sequence number of a period, and the first correspondence comprises each TAC and each end sequence number corresponding to each TAC;
the period information comprises a period time interval, and the first correspondence comprises each TAC and each period time interval corresponding to each TAC;
the period information comprises a period sequence number interval, and the first correspondence comprises each TAC and each period sequence number interval corresponding to each TAC; or
the period information comprises a quantity of periods, and the first correspondence comprises each TAC and each quantity of periods corresponding to each TAC.

10. The broadcast message transmission method according to claim 6, wherein the broadcast message carries first indication information, and wherein the first indication information indicates whether the broadcast message alternately carries TACs in sequence.

11. The broadcast message transmission method according to claim 10, wherein the first indication information comprises one or more reused bits in a TAC field, or one or more newly added bits in a TAC field.

12. A communications apparatus, comprising:
at least one processor; and
at least one non-transitory memory coupled to the at least one processor and configured to store instructions that, when executed by the at least one processor, cause the communications apparatus to:
receive a broadcast message periodically sent by a satellite device, wherein the broadcast message alternately carries tracking area codes (TACs) corresponding to one or more tracking areas (TAs) of at least two TAs, and wherein coverage of a beam of the satellite device belongs to the at least two TAs;
record, when detecting for a first time that a TA corresponding to a TAC in a current broadcast message received in a current period does not belong to a first TA list, the TA in a second TA list, wherein the first TA list comprises one or more first TAs configured to page the communications apparatus, and wherein the second TA list is configured to store a detected TA that is not in the first TA list;
continue detecting a subsequent broadcast message; and
determine, based on a subsequent TAC in the subsequent broadcast message, whether to initiate a TA update procedure to update the first TA list.

13. The communications apparatus according to claim 12, wherein the at least one processor is configured to execute the instructions to further cause the communications apparatus to:
record, when detecting that a subsequent TA corresponding to the subsequent TAC does not belong to the first TA list or the second TA list, the subsequent TA in the second TA list; and
clear the second TA list when detecting that at least one TA in the subsequent TA belongs to the first TA list; or
initiate the TA update procedure when detecting that a subsequent TA corresponding to the subsequent TAC belongs to the second TA list but not the first list; and
clear the second TA list.

14. The communications apparatus according to claim 12, wherein a first broadcast message sent in a period carries one TAC or a plurality of TACs.

15. The communications apparatus according to claim 12, wherein the broadcast message carries first indication information, and wherein the first indication information indicates whether the broadcast message alternately carries TACs in sequence.

16. The communications apparatus according to claim 15, wherein the first indication information comprises one or more reused bits in a TAC field, or one or more newly added bits in a TAC field.

17. A communications apparatus, comprising:
at least one processor; and
at least one memory coupled to the at least one processor and configured to store instructions that, when executed by the at least one processor, cause the communications apparatus to:
determine that coverage of a beam belongs to at least two tracking areas (TAs); and
periodically output a broadcast message using the beam,
wherein the broadcast message alternately carries tracking area codes (TACs) corresponding to one or more TAs of the at least two TAs.

18. The communications apparatus according to claim 17, further comprising a transceiver configured to periodically send the broadcast message based on a first correspondence between period information of the broadcast message and a TAC, wherein the first correspondence is one of prestored in the communications apparatus or notified by a core network device.

19. The communications apparatus according to claim 18, wherein the period information comprises a sequence number of each period, and wherein the first correspondence comprises:
the sequence number of each period for periodically sending the broadcast message and a first TAC that is in one-to-one correspondence with the sequence number of each period; or a start moment of each period for periodically sending the broadcast message and a second TAC that is in one-to-one correspondence with the start moment of each period.

20. The communications apparatus according to claim 18, wherein:
- the period information comprises a start moment of a period, and the first correspondence comprises each TAC and each start moment corresponding to each TAC;
- the period information comprises a start sequence number of a period, and the first correspondence comprises each TAC and each start sequence number corresponding to each TAC;
- the period information comprises an end moment of a period, and the first correspondence comprises each TAC and each end moment corresponding to each TAC;
- the period information comprises an end sequence number of a period, and the first correspondence comprises each TAC and each end sequence number corresponding to each TAC;
- the period information comprises a period time interval, and the first correspondence comprises each TAC and each period time interval corresponding to each TAC;
- the period information comprises a period sequence number interval, and the first correspondence comprises each TAC and each period sequence number interval corresponding to each TAC; or
- the period information comprises a quantity of periods, and the first correspondence comprises each TAC and each quantity of periods corresponding to each TAC.

21. The communications apparatus according to claim 17, wherein the broadcast message carries first indication information, and wherein the first indication information indicates whether the broadcast message alternately carries TACs in sequence.

22. The communications apparatus according to claim 21, wherein the first indication information comprises one or more reused bits in a TAC field, or one or more newly added bits in a TAC field.

* * * * *